United States Patent
Falla Cepeda

(10) Patent No.: US 12,114,179 B2
(45) Date of Patent: Oct. 8, 2024

(54) METHOD, APPARATUS, AND SYSTEM FOR PROVIDING A WIRELESS DATA CONNECTION TO A VEHICLE

(71) Applicant: HERE GLOBAL B.V., Eindhoven (NL)

(72) Inventor: David Falla Cepeda, Berlin (DE)

(73) Assignee: HERE GLOBAL B.V., Eindhoven (NL)

(*) Notice: Subject to any disclaimer, the term of this patent is extended or adjusted under 35 U.S.C. 154(b) by 290 days.

(21) Appl. No.: 17/544,569

(22) Filed: Dec. 7, 2021

(65) Prior Publication Data
US 2023/0180022 A1 Jun. 8, 2023

(51) Int. Cl.
H04W 16/28 (2009.01)
H04W 4/02 (2018.01)
H04W 4/44 (2018.01)

(52) U.S. Cl.
CPC .......... *H04W 16/28* (2013.01); *H04W 4/023* (2013.01); *H04W 4/027* (2013.01); *H04W 4/44* (2018.02)

(58) Field of Classification Search
CPC ....... H04W 16/28; H04W 4/44; H04W 4/023; H04W 4/027
See application file for complete search history.

(56) References Cited

U.S. PATENT DOCUMENTS

| | | | |
|---|---|---|---|
| 9,798,320 B2 | 10/2017 | Shattil | |
| 10,075,218 B2 | 9/2018 | Rahman et al. | |
| 10,313,839 B2 | 6/2019 | Dwang et al. | |
| 2005/0073970 A1* | 4/2005 | Davidson | H04W 24/00 370/328 |
| 2016/0150591 A1* | 5/2016 | Tarighat Mehrabani | H04W 52/38 370/329 |
| 2017/0013521 A1* | 1/2017 | Baldemair | H04W 72/23 |
| 2017/0245192 A1* | 8/2017 | Sadri | H04W 36/0009 |
| 2017/0301220 A1* | 10/2017 | Jarrell | H04W 4/70 |
| 2017/0311307 A1* | 10/2017 | Negus | H01Q 21/24 |
| 2018/0063852 A1 | 3/2018 | Kang et al. | |
| 2019/0137601 A1* | 5/2019 | Driscoll | G01S 13/424 |
| 2019/0150003 A1* | 5/2019 | He | H04B 7/0617 342/368 |
| 2020/0145855 A1 | 5/2020 | Hahn et al. | |

(Continued)

OTHER PUBLICATIONS

Amendola, et al., "5G for Connected and Automated Road Mobility in the European Union," Deliverable D2.1 5G Carmen Use Cases and Requirement; https://5Gcarmen.eu/wp-content/uploads/2020/03/5G_CARMEN_D2.1_FINAL.pdf, May 13, 2019 (94 pages).

(Continued)

*Primary Examiner* — Ernest G Tacsik
(74) *Attorney, Agent, or Firm* — Adil M. Musabji

(57) ABSTRACT

An approach is provided for providing a wireless data connection to a vehicle. In some aspects, the approach includes receiving vehicle cluster information that is based at least in part on location information of each vehicle in a vehicle cluster traveling on a road link. The approach also includes determining one or more parameters for at least one antenna beam based on the vehicle cluster information, wherein the at least one antenna beam is configured to sufficiently cover the vehicle cluster. The approach further includes controlling the at least one antenna beam to track the vehicle cluster along the road link.

18 Claims, 15 Drawing Sheets

(56) References Cited

U.S. PATENT DOCUMENTS

| | | | | |
|---|---|---|---|---|
| 2020/0344820 A1* | 10/2020 | Fowe | .................... | G08G 1/0112 |
| 2021/0084441 A1* | 3/2021 | Zhou | .................... | H04W 64/003 |
| 2021/0192959 A1* | 6/2021 | Sujan | .................... | G05D 1/0295 |
| 2021/0327280 A1* | 10/2021 | Choi | ........................ | H04L 67/52 |
| 2022/0369083 A1* | 11/2022 | Goel | .................... | G05D 1/0293 |
| 2023/0027476 A1* | 1/2023 | Li | .......................... | H04W 24/08 |

OTHER PUBLICATIONS

U.S. Appl. No. 17/240,607, filed Apr. 26, 2021, entitled: "Method, Apparatus, and System for Building Single-Path Communication Signal Map Data for Road Links," Inventor(s): David Falla Cepeda (Unpublished).

* cited by examiner

METHOD, APPARATUS, AND SYSTEM FOR PROVIDING A WIRELESS DATA CONNECTION TO A VEHICLE

BACKGROUND

The increasing number of connected vehicles presents a challenge for managing available high-speed communication bandwidth. The demand for high-speed data networks, including 5G networks, is increasing significantly and connected/autonomous vehicles will become one of the biggest consumers of such bandwidth. There are two primary reasons for which high-speed connectivity is wanted in vehicles. The first one is meeting data needs of vehicles for improving the road safety, navigation and driving assistance. The second one is meeting data demands of people on roads. People in vehicles expect to have the same connectivity as they have at home and at work. Accordingly, 5G network service providers face significant technical challenges to provide 5G signal coverage, particularly on road links.

SOME EXAMPLE EMBODIMENTS

Therefore, there is a need for providing data bandwidth to vehicles and data consumers in vehicles moving along road networks.

According to one aspect of the disclosure, a method for providing a wireless data connection to a vehicle is disclosed. The method includes receiving vehicle cluster information that is based at least in part on location information of each vehicle in a vehicle cluster traveling on a road link. The method also includes determining one or more parameters for at least one antenna beam based on the vehicle cluster information, wherein the at least one antenna beam is configured to sufficiently cover the vehicle cluster. The method further includes controlling the at least one antenna beam to track the vehicle cluster along the road link.

According to another aspect of the disclosure, an apparatus for providing a wireless data connection to a vehicle is disclosed, wherein the apparatus includes at least one processor and at least one memory including computer program code for one or more programs. The at least one memory and the computer program code is configured to, with the at least one processor, cause the apparatus to receive location information from one or more vehicles on a road link. The apparatus is also caused to generate a vehicle cluster based at least on the received location information and a beamforming capability information of one or more antenna arrays proximate to the road link. The apparatus is further caused to determine vehicle cluster information for the vehicle cluster based on road geometry information of the road link. The apparatus is yet further caused to transmit the vehicle trajectory information to the one or more antenna arrays.

According to yet another aspect of the disclosure, a non-transitory computer-readable storage medium carrying one or more sequences of one or more instructions which, when executed by one or more processors, cause an apparatus to receive location information from one or more vehicles and generate a vehicle cluster based at least on the received location information and a beamforming capability information of one or more antenna arrays proximate to the road link. The apparatus is also caused to determine vehicle cluster information for the vehicle cluster based on road geometry information of the road link, determine one or more parameters for at least one antenna beam based on the vehicle cluster information, wherein the at least one antenna beam is configured to sufficiently cover the vehicle cluster. The apparatus is further caused to control the at least one antenna beam to track the vehicle cluster along the road link.

According to yet another of the disclosure, a computer program product carrying one or more sequences of one or more instructions which, when executed by one or more processors, cause an apparatus to receive location information from one or more vehicles and generate a vehicle cluster based at least on the received location information and a beamforming capability information of one or more antenna arrays proximate to the road link. The apparatus is also caused to determine vehicle cluster information for the vehicle cluster based on road geometry information of the road link, determine one or more parameters for at least one antenna beam based on the vehicle cluster information, wherein the at least one antenna beam is configured to sufficiently cover the vehicle cluster. The apparatus is further caused to control the at least one antenna beam to track the vehicle cluster along the road link.

In addition, for various example embodiments of the disclosure, the following is applicable: a method comprising facilitating a processing of or processing (1) data or (2) information or (3) at least one signal, the (1) data or (2) information or (3) at least one signal based, at least in part, on (or derived at least in part from) any one or any combination of methods (or processes) disclosed in this application as relevant to any embodiment of the disclosure.

For various example embodiments of the disclosure, the following is also applicable: a method comprising facilitating access to at least one interface configured to allow access to at least one service, the at least one service configured to perform any one or any combination of network or service provider methods (or processes) disclosed in this application.

For various example embodiments of the disclosure, the following is also applicable: a method comprising facilitating creating or facilitating modifying (1) at least one device user interface element or (2) at least one device user interface functionality, the (1) at least one device user interface element or (2) at least one device user interface functionality based, at least in part, on data or information resulting from one or any combination of methods or processes disclosed in this application as relevant to any embodiment of the disclosure, or at least one signal resulting from one or any combination of methods (or processes) disclosed in this application as relevant to any embodiment of the disclosure.

For various example embodiments of the disclosure, the following is also applicable: a method comprising creating or modifying (1) at least one device user interface element or (2) at least one device user interface functionality, the (1) at least one device user interface element or (2) at least one device user interface functionality based at least in part on data or information resulting from one or any combination of methods (or processes) disclosed in this application as relevant to any embodiment of the disclosure, or at least one signal resulting from one or any combination of methods (or processes) disclosed in this application as relevant to any embodiment of the disclosure.

In various example embodiments, the methods (or processes) can be accomplished on the service provider side or on the mobile device side or in any shared way between service provider and mobile device with actions being performed on both sides.

For various example embodiments, the following is applicable: An apparatus for performing steps of a method claims.

Still other aspects, features, and advantages of the disclosure are readily apparent from the following detailed description, simply by illustrating a number of particular embodiments and implementations, including the best mode contemplated for carrying out the disclosure. The disclosure is also capable of other and different embodiments, and its several details can be modified in various obvious respects, all without departing from the spirit and scope of the disclosure. Accordingly, the drawings and description are to be regarded as illustrative in nature, and not as restrictive.

BRIEF DESCRIPTION OF THE DRAWINGS

The embodiments of the disclosure are illustrated by way of example, and not by way of limitation, in the figures of the accompanying drawings:

FIG. 5A is a flowchart setting forth steps of a process for emitting an antenna beam to a vehicle cluster along a road link, according to example embodiment(s);

DETAILED DESCRIPTION OF THE EMBODIMENTS

Examples of a method, apparatus, and computer program for providing wireless data connection to a vehicle are disclosed. In the following description, for purposes of explanation, numerous specific details are set forth in order to provide a thorough understanding of the embodiments of the disclosure. It is apparent, however, to one skilled in the art that the embodiments of the disclosure may be practiced without these specific details or with an equivalent arrangement. In some instances, well-known structures and devices are shown in block diagram form in order to avoid unnecessarily obscuring the embodiments of the disclosure.

Figure 1:
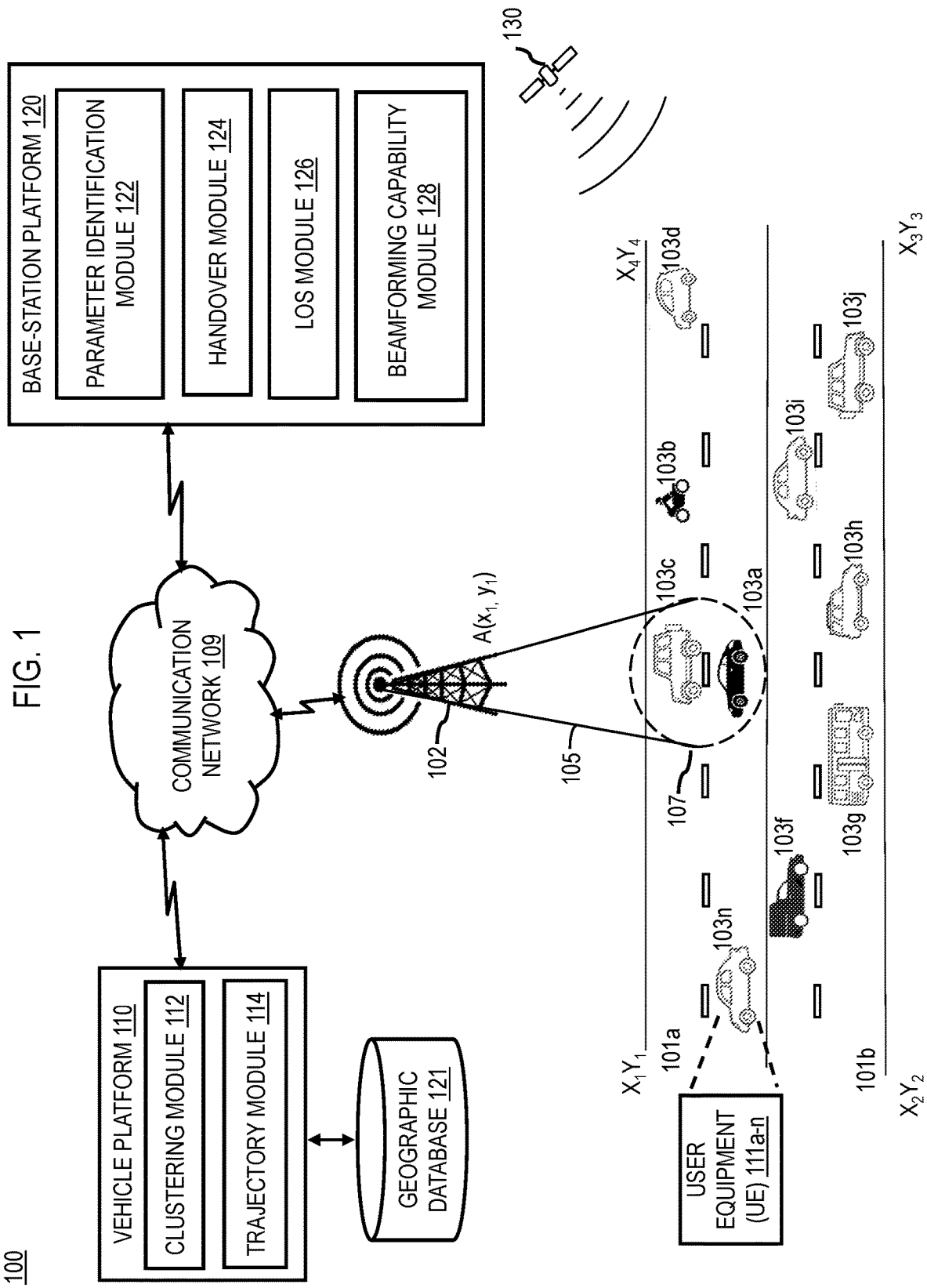
FIG. 1 is a diagram of a system capable of providing wireless data connection to a vehicle, according to example embodiment(s)

FIG. 1 is a diagram of a system 100 capable of providing a wireless data connection to a vehicle along a road network, according to example embodiment(s). A road network may include various road links, such as road links 101a and 101b shown in the example of FIG. 1, where a number of vehicles 103a-103n are moving in both directions. In some embodiments, road links 101a,b may include road links or road segments that represent roads, streets, parking areas, or paths. Nodes (not shown) are end points corresponding to the respective links (or segments), and may represent intersections, exits, ramps, and the like. To provide communication access, road links of a road network may be covered by one or more antenna array(s) 102, as shown in FIG. 1. Antenna array(s) 102 may include 5G access points, for instance, by way of 5G cell units. 5G communication represents a significant speed improvement over 4G, and utilizes either the same 600-700 MHz spectrum as 4G (low-band), 2.5-3.7 GHz (mid-band, between 2.4 and 5 GHz Wi-Fi), and 25-39 GHz millimeter wave (high-band). Low and mid band 5G signals have dispersion characteristics that still permit communication when multipath signals are received for e.g., reflected or scattered signals, and can reach up to 900 Mbit/s. The industry consortium setting standards for 5G is the 3rd Generation Partnership Project (3GPP). It defines any system using 5G New Radio (5G NR), which includes minimum standards as set by the International Telecommunication Union (ITU).

High-band 5G communication requires direct signal paths to achieve gigabit speeds. This is because signals in this frequency range do not sufficiently penetrate surrounding obstructions, such as buildings, trees, advertisement boards, vehicles etc., and decay quickly when reflected. Also, high-band 5G relies on shorter millimeter wavelengths that travel only short distances, which requires small, closely placed cell facilities to complement large cell towers and provide adequate coverage. Such cells are frequently attached to utility poles, light poles, or buildings, and work collectively to create radio access networks ("RAN"). Also, the cells have a much shorter transmission range compared to traditional 4G and other cell towers (typically 500 to 1,000 ft). Since antennas of 5G access point/cells are highly directional, beamforming techniques to provide direct 5G signals to very specific areas around a cell site. However, beamforming does not overcome some of the deficiencies of 5G as described.

Although high-speed 5G connectivity is not readily accessible on road networks, 5G communication is still viewed as a solution to high-speed data for vehicles. This means that network providers will need to develop a whole new, costly infrastructure with a large number of antenna networks to provide high-speed connectivity to the vehicles on the road. Moreover, obstructions (e.g., buildings, trees, hills, etc.) can affect 5G connectivity, and present difficulties in establishing 5G infrastructure.

The present disclosure describes a technical solution to address such issues in the field of data communication. In particular, system 100 of FIG. 1 introduces the capability of providing a wireless data connection to one or more vehicles by using a beamforming feature of the 5G network. In one embodiment, the system 100 may be configured to control the emission of one or more antenna beams 105 (e.g. by way of beamforming) to vehicle clusters along a road link of a road network. The system 100 may provide high speed connectivity by directing the antenna beam(s) 105 to move along with the vehicles. As vehicles traverse multiple links of the road network, continuous 5G high speed connectivity can be afforded to the vehicles. The system 100 may include, or communicate with, an array of antennas, and control the direction of a wavefront produced by the array by appropriately weighting the magnitude and phase of antenna signals generated by each individual antenna in the array. In this manner, antenna beam(s) 105 may be focused toward a specific location or in a desired direction.

In one embodiment, the system 100 can receive location information from one or more vehicles 103*a*-103*n* (collectively referred to as vehicles 103) traversing road link(s) 101, as shown in FIG. 1. The vehicles 103 may include standard vehicles, autonomous vehicles, heavily assisted driving (HAD) vehicles, semi-autonomous vehicles, etc. Vehicles 103 can be 5G-enabled by incorporating in-vehicle 5G communication modules or by using standalone units, such as mobile devices. In some embodiments, 5G communication module in the vehicles 103 can configured to measure an estimated distance to one or more antenna arrays 102 and estimate one or more angle(s) based on signal strength(s) detected by antenna elements of the 5G communication module. The estimated angles can include azimuth angles or elevation angles from an access point.

In one embodiment, the vehicles 103 may communicate with a vehicle platform 110 and a base station platform 120 via a communication network 109, as shown in FIG. 1. In addition, vehicles 103 can determine their own locations on the road link(s) 101 by using inbuilt location sensors, such as GNSS receivers, or by using location sensors incorporated in mobile devices. In one embodiment, location sensors may be present in user equipment 111 of a user riding the vehicle 103. The user equipment 111 may include mobile phones running specialized applications. Such applications can collect location data as the user equipment 111 is being carried by persons or things traveling the roadway network.

By way of example, the UEs 111 may be or include any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that UE 111 can support any type of interface to the user (such as "wearable" circuitry, etc.). In one embodiment, UE 111 may be associated with a vehicle 103 (e.g., a mobile device) or be a component part of the vehicle 103 (e.g., an embedded navigation system).

In one embodiment, one or more vehicles 103 may be equipped with 5G communication modules that include antennas configured to receive 5G antenna beam(s) 105 while travelling on the road link 101. A 5G communication module may include a variety of other hardware and software, including any combination of communication chips, memory, radio frequency (RF) circuitry, and so forth, that is configured for transmission and reception of signals, such as antenna beam(s) 105 generated by antenna array(s) 102. Such 5G communication modules can be built-in or mounted on a vehicle. In one embodiment, one or more vehicles 103 may be equipped with a communication module configured to receive or exchange various signals, including multipath tolerant connections, such as 2G, 3G, 4G LTE and 5G low and mid band signals while travelling on the road link 101.

In one embodiment, the system 100 may be configured to generate a vehicle cluster 107 based on the location information received from the one or more vehicles 103 and beamforming capability information for one or more antenna arrays 102 located proximate to the road link 101. In one implementation, the vehicle platform 110 may be configured to generate the vehicle cluster 107 based on the received location information and the beamforming capability information. To do so, the vehicle platform 110 may include one or more components for generating the cluster. Although depicted as a separate entity in FIG. 1, it is contemplated that the vehicle platform 110 may be implemented as a module or component of the system 100.

As shown in FIG. 1, in some embodiments, the vehicle platform 110 may include a clustering module 112. The clustering module 112 may be configured to generate a vehicle cluster 107 by selecting one or more vehicles from vehicles 103 based on predefined criteria, such as vehicle co-location or proximity. In some aspects, a vehicle cluster 107 may be generated based on a predefined distance, such as a safe or average distance between the vehicles 103, or a maximum distance between the farthest vehicles in a cluster (e.g. determined using GNSS locations). The predefined distance may be less than or equal to 100 meters, although other values are possible. The predefined distance between the vehicles in the vehicle cluster 107 may be varied according to traffic conditions and speed of the vehicles required to keep safe distance. Vehicle clusters may also be generated based on various vehicle parameters, such as heading, steering wheel angle, speed, acceleration, driving lane position, vehicle length, or a combination thereof. The list of vehicle parameters is provided by way of illustration and not limitation, and any vehicle parameters may be used to generate vehicle clusters. Furthermore, other factors and information, such as vehicle models, traffic patterns, road topology, driving behaviors, vehicle sensors, map data, vehicle mobility, surrounding obstructions/objects (i.e., fixed or moving), beamforming capability, may also be used to generate the vehicle cluster. To this end, the clustering module 112 may utilize a variety of algorithms, including machine learning algorithms, to generate the cluster.

As described, the system 100 may be configured to generate a vehicle cluster 107 using beamforming capability information for one or more antenna arrays 102. In one embodiment, the beamforming capability information may be precalculated and stored in the geographical database 121 along with a respective location of one or more antenna arrays 102. The beamforming capability information may include information about the maximum width and maximum length of an antenna beam that can be emitted by antenna array(s) 102 proximate to the road link 101. The beamforming capability information may then be used to determine the size and shape of the antenna beam 105, for instance. In some aspects, the size and shape of the antenna beam 105 may be further used to determine the maximum size of the vehicle cluster 107. The beamforming capability of the antenna beam 105 is dependent on a distance between the one or more antenna arrays 102 and a location of the vehicle cluster 107 on the road link 101. The beamforming capability of the antenna beam 105 can also be dependent on the signal strength of antenna beam 105 emitted by the one or more antenna arrays 102. Furthermore, the maximum signal strength of the antenna beam 105 is usually regulated by a local authority to limit 5G radiation exposure.

In some implementations, the beamforming capability information may also include beamform trajectory information corresponding to the road link, which can be precomputed. The beamform trajectory information enables antenna array(s) 102 to direct and track antenna beams continuously to one or more vehicle clusters 107, as the vehicle cluster(s) 107 is progressing along the road link 101. The beamform trajectory information may be computed based on the location of the antenna array(s) 102 (e.g. $A(x_1, y_1)$ in FIG. 1), the height of the antenna array(s) 102, the angle of elevation with respect to the road link 101, the angle of azimuth with respect to the road link 101, the location of the road link 101 (e.g. $X_1Y_1$, $X_2Y_2$, $X_3Y_3$ and $X_4Y_4$), the speed of the vehicle cluster 107, or a combination thereof. In some aspects, the location of the antenna array(s) 102, the height of the antenna array(s) 102, the angle of elevation with respect to the road link 101, the angle of azimuth with respect to the road link 101, and the location of the road link 101 may be constant parameters used for computing the beamform trajectory information for a particular road link 101. By contrast, the speed of the vehicle cluster 107 may vary along the road link 101, based on traffic, weather, road conditions, etc. And so, once a vehicle cluster 107 is generated, the speed and direction of the cluster, along with other vehicle cluster information, may be determined, and combined with the beamform trajectory information to control the antenna array(s) 102 to direct antenna beams 105 to the vehicle cluster 107.

In an example embodiment, the beamforming capability information for the antenna array(s) 102 may be determined by a beamforming capability module 128, as shown in FIG. 1. The beamforming capability module 128 may be configured to receive or access road geometry information associated with the road link 101, which can be stored in the geographic database 121. Road geometry information enables the trajectory module 114 to estimate the distance between the antenna array(s) 102 and a vehicle cluster 107 on the road link 101, as the vehicle cluster 107 rarely leaves the road link 101 to go off-road. In some implementations, the road geometry information may include a representation of road links (or road segments) of a road network. The road geometry information may also include geometric entities (e.g., records, attributes, fields) or characteristics used for describing road or lane positions (e.g., latitude, longitude, or x, y positions for the road/lane center), road shape/curvature (e.g. b-spline, parametric curve), direction or heading (e.g. in deg, rad). The beamforming capability module 128 determines the beamforming capability information of one or more antenna arrays based on the distance between the one or more antenna arrays 102 and the vehicle cluster 107 and a maximum signal strength of the one or more antenna array 102. The maximum signal strength of the antenna array 102 is usually regulated by a local authority to limit 5G radiation exposure. The geographical database 121 stores the road link road geometry information with respect to the road link 101.

In an embodiment, the system 100 may be configured to determine vehicle cluster information for a vehicle cluster 107 based on a road geometry information of a road link 101. In an embodiment, the trajectory module 114 determines the vehicle cluster information for the vehicle cluster 107. To do so, the trajectory module 114 may receive or access road geometry information of the road link 101 from the geographic database 121. In some implementations, the vehicle cluster information may be determined based on the assumption that the vehicle cluster 107 rarely leaves the road link 101 to go off road. Vehicle cluster information for the vehicle cluster 107 may include size and shape of vehicles, number of vehicles, a direction of travel, average speed, or a combination thereof. The list of these parameters is provided by way of illustration and not limitation. In some embodiments, the average speed of the vehicle cluster 107 may be computed by averaging individual speed of vehicles present in the vehicle cluster 107. The average speed of the vehicle cluster 107 may be dependent on speed limit of the road link. Vehicle cluster speed may be utilized in determining the appropriate control of antenna beams.

As shown in FIG. 1, the vehicle platform 110 may include a clustering module 112 and a trajectory module 114. Though depicted as a separate entity in the figure, it is contemplated that the vehicle platform 110 may be implemented as a module or may be part of any component of the system 100. In one embodiment, the vehicle platform 110, the clustering module 112 and the trajectory module 114 may be implemented as a cloud-based service, local service, native application, or combination thereof.

In one embodiment, the system 100 may be configured to transmit vehicle cluster information to the one or more antenna arrays 102. The antenna arrays 102 may use the vehicle cluster information to emit and direct antenna beam(s) 105 to vehicle cluster(s) moving along the road link 101. In an embodiment, the system 100 transmits the vehicle cluster information to the one or more antenna arrays 102 in proximity to the vehicle cluster or the road link. As referred to herein, an antenna array may be in proximity to a vehicle cluster or road like if it is within a predefined distance, (e.g. 5 km, 3 km, 1 km, or less) from the vehicle cluster or road link.

In one example embodiment, the one or more antenna arrays 102 can be installed at a small cell unit or a large standalone cell tower. These antenna array(s) 102 can quickly adjust power usages based on current loads. For instance, when they are not in use, the antenna array(s) 102 will drop down into a lower power state in a few milliseconds, and then re-adjust quickly when more power is needed to support receiving devices (e.g., vehicles 103, IoT objects, etc.). The antenna array(s) 102 can be owned or operated by private or public entities for free or fees. For example, enterprises, local communities, individuals, etc. can own or operate their private antenna array(s) 102 that provide 5G coverage on one or more road links. As other examples, telecommunication service providers, government/municipality agencies, etc. can own or operate public antenna arrays that provide 5G coverage on road links. For instance, a highway transportation agency can install public antenna arrays on its transportation/road infrastructure (e.g., on light poles, traffic signs, etc.). The small cell unit is implemented as Road Side Unit (RSU), that is mounted along a road or pedestrian passageway.

In some implementations, the system 100 may be configured to refine antenna beams emitted by antenna array(s) 102 by considering information about their design and installation. Such information can be retrieved from websites or databases of 5G service providers. Antenna arrays can be classified based on input output ports (e.g., single input single output (SISO), multiple input, multiple output (MIMO), etc.), antenna types (e.g., monopole, dipole, magneto-electric (ME) dipole, loop, fractal, inverted F antenna (IFA), planar inverted-F antenna (PIFA), etc.), product models (supporting different frequency rages, isolations, gains, efficiencies, etc.), etc. By way of example, 5G massive multiple input, multiple output (mMIMO) antennas become more popular since they have large numbers of antenna elements or connections to send and receive more data with many participating entities (e.g., vehicles, user devices, etc.) simultaneously and with high throughput. For instance, the system 100 can retrieve antenna arrays' specification and deployment data from a 5G communication service provider including: a site ID, azimuth, full beamwidth, radius, tilt angle, frequency or frequency range, etc., then covert the antenna arrays' specification and deployment data for emitting the 5G antenna beam to the vehicle cluster 107.

Figure 2:
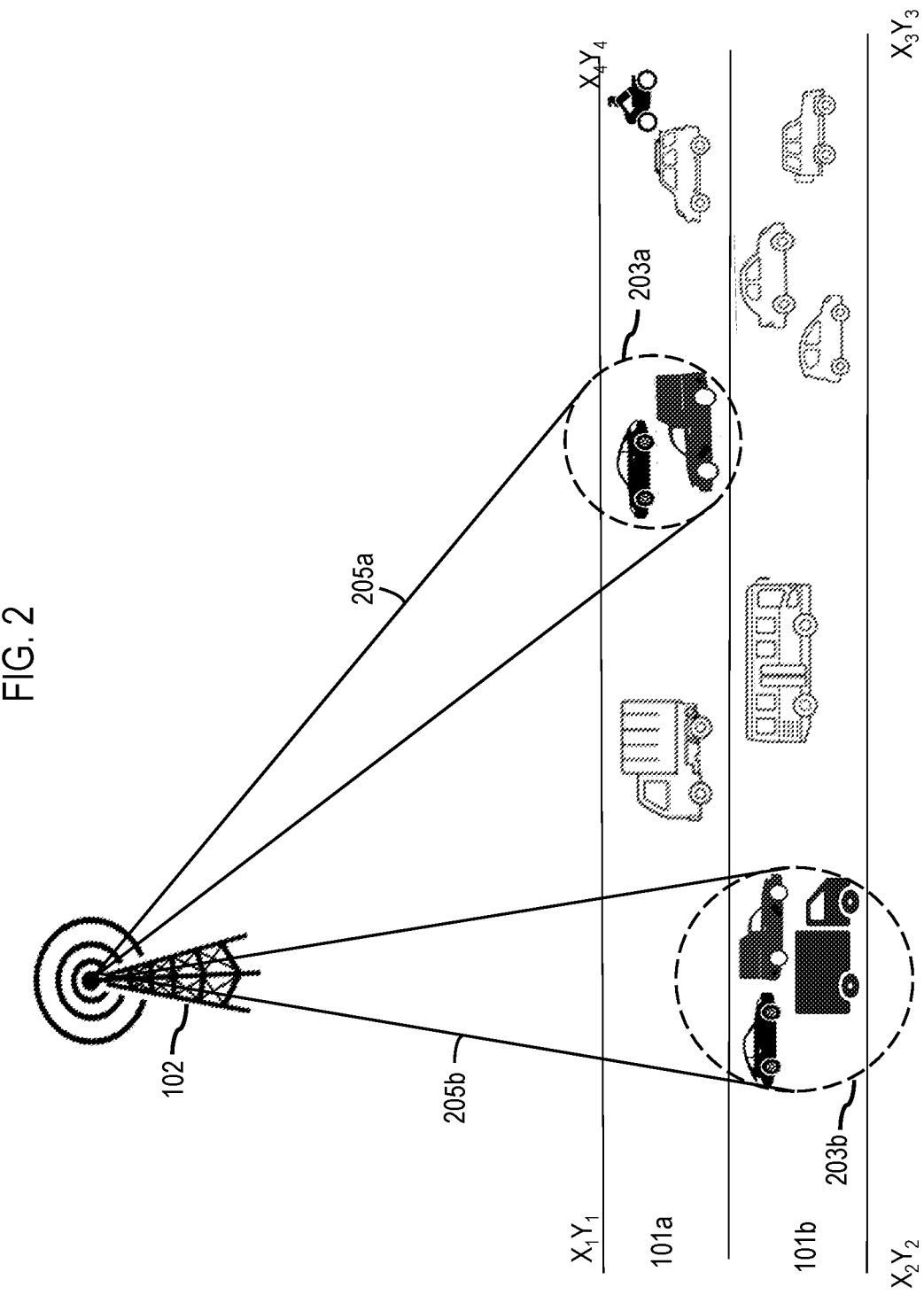
FIG. 2 is a diagram illustrating antenna array emitting antenna beams to vehicle clusters along a road link, according to example embodiment(s)

Referring now to FIG. 2, a diagram illustrating antenna array(s) 102 emitting and directing multiple antenna beams (205a, 205b) toward multiple vehicle clusters (203a, 203b). The vehicles are moving along the road links 101a,b. In some implementations, the vehicles may share their location with the vehicle platform 110, such as in cases when 5G connectivity is requested or needed along the road network. In some implementations, the clustering module 112 may be used to generate vehicle clusters 203a and 203b for a road link 101a and 101b, respectively. As described, the positions of vehicles on the road, as well as beamforming capability information of the antenna array(s) 102 may be in the process of generating the clusters. As shown in the figure, in some embodiments, the clustering module 112 may generate two different vehicle clusters (203a, 203b) on the road links 101a and 101b, where the direction of travel for the vehicles 103 in each cluster is opposite.

In some implementations, the clustering module 112 may assign vehicles to an existing cluster. That is, vehicles that satisfy predefined criteria, as described, may be added to an already-formed cluster. In other embodiments, the clustering module 112 can remove vehicles from a vehicle cluster based on, for example, a turning of a vehicle, a stoppage of a vehicle, a changing of acceleration of a vehicle, a changing of an operational mode of a vehicle (e.g., cruise control, manual drive mode, autonomous mode), an activation or deactivation of a function of a vehicle (e.g., turn signals), sending a message, etc. In yet other embodiments, the clustering module 112 may generate or dissolve different clusters to provide antenna beams to the one or more vehicles by the antenna array 102 during travel on road link 101.

In some embodiments, the trajectory module 114 may be configured to determine vehicle cluster information for the vehicle clusters 203a and 203b (shown in FIG. 2), and transmit the vehicle cluster information to the antenna array(s) 102. The antenna array(s) 102 can emit and direct antenna beams 205a and 205b to the vehicle cluster(s) 203a and 203b, respectively. The vehicle cluster information for both the clusters 203a and 203b may be made available to the antenna array(s) 102, which would enable the antenna array(s) 102 to predict the movement of the vehicle cluster(s) 203a and 203b along the road links 101a and 101b. Thus, the antenna beam(s) 205a and 205b can configured to follow the vehicle cluster(s) 203a and 203b along the road.

In one embodiment, the vehicle platform 100 may optionally include a service quality module (not shown in FIG. 1) that can be configured to receive vehicle sensor data from one or more vehicles. The vehicle sensor data can indicate a number of measurements of service quality for one or more antenna beams detected at the one or more vehicle cluster(s). For instance, the existing or future 5G communication modules in vehicles can include built-in quality of service (QoS) components to automatically measure and monitor 5G communication signals QoS. For example, the QoS measurements may include download transmission speeds, upload transmission speeds, delay time periods, ping time periods, jitter measurements, or a combination thereof. In an embodiment, QoS measurements may be mapped with the geographical data in the geographical database 121.

Figure 3:
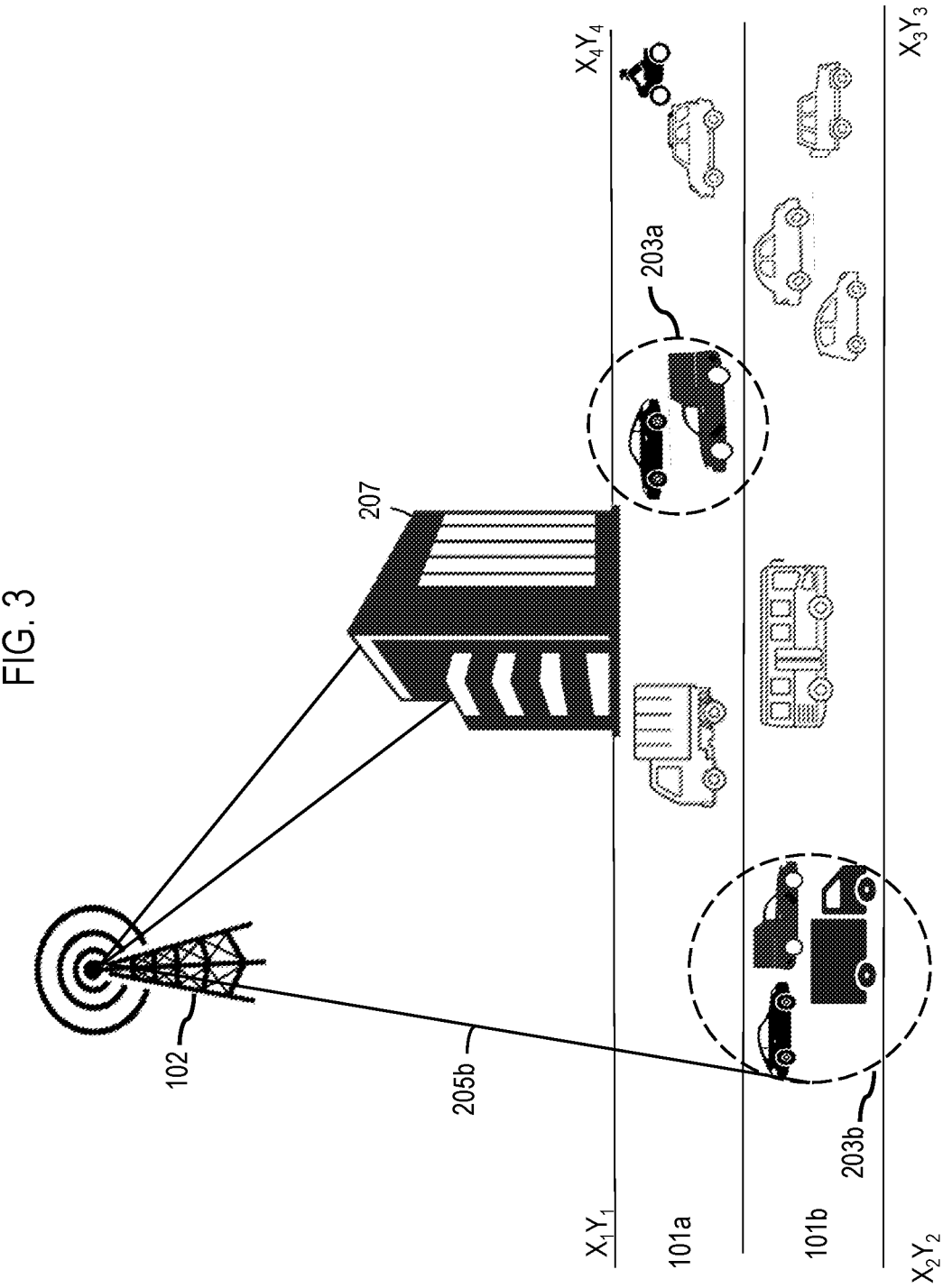
FIG. 3 is a diagram illustrating antenna beams getting obstructed by a building, according to example embodiment(s)

Referring now to FIG. 3, a diagram an antenna beam being obstructed by a building 207 is shown. As discussed with reference to FIG. 2, the trajectory module 114 may determine vehicle cluster information for vehicle clusters 203a and 203b, and transmit the vehicle cluster information to the antenna array(s) 102. The antenna array(s) 102 can then emit and direct antenna beam(s) to the vehicle cluster 203a and 203b, respectively, as they are traveling. However, as shown in FIG. 3, signals from the antenna array(s) 102 would not be able to reach vehicle cluster 203a while near a building 207. This is because the beamforming feature of a 5G network requires direct line of sight between the antenna array(s) 102 and object (i.e. the vehicle cluster 203a in FIG. 3). In such a case, the antenna array(s) 102 may provide connectivity to the vehicle cluster 203a by implementing a multipath tolerant connection, such as 2G, 3G, LTE or 5G low and mid bands.

Referring again to FIG. 1, in an embodiment, the geographic database 121 may store three-dimensional (3D) object data, such as buildings, hills, signs, trees, etc., which can be found between antenna arrays and the road, and potentially obstruct antenna beams. In an embodiment, the base station platform 120 may include a line of sight (LOS) module 126. The LOS module 126 may be configured to communicate with the geographical database 121 to receive the stored three-dimensional (3D) object data, and identify potential obstructions between antenna array(s) 102 and vehicle clusters on road link 101. To this end, the LOS module may receive or access a variety of information, such as vehicle location data, antenna array location data, vehicle cluster information, and so forth. When an obstruction is detected between the antenna array(s) 102 and road link 101 for any particular portion of the vehicle cluster trajectory, the antenna array(s) 102 may be controlled to utilize a multipath tolerant connection, instead of 5G antenna beam, to transmit signals the vehicle cluster for that portion. This enables continuous connectivity to the vehicle cluster along the road link 101.

In addition to stationary obstructions, 5G antenna beam can sometimes be blocked by temporary obstructions (e.g., big trucks or other vehicles) on the road. Therefore, in some embodiments, the system 100 can use a crowd-sourcing method to collect temporary obstruction data from vehicles 103 on the roadway. After identifying the presence of temporary obstruction on a stretch of a road link, the system 100 can switch to multipath tolerant connection on the particular stretch of the road link.

Figure 4:
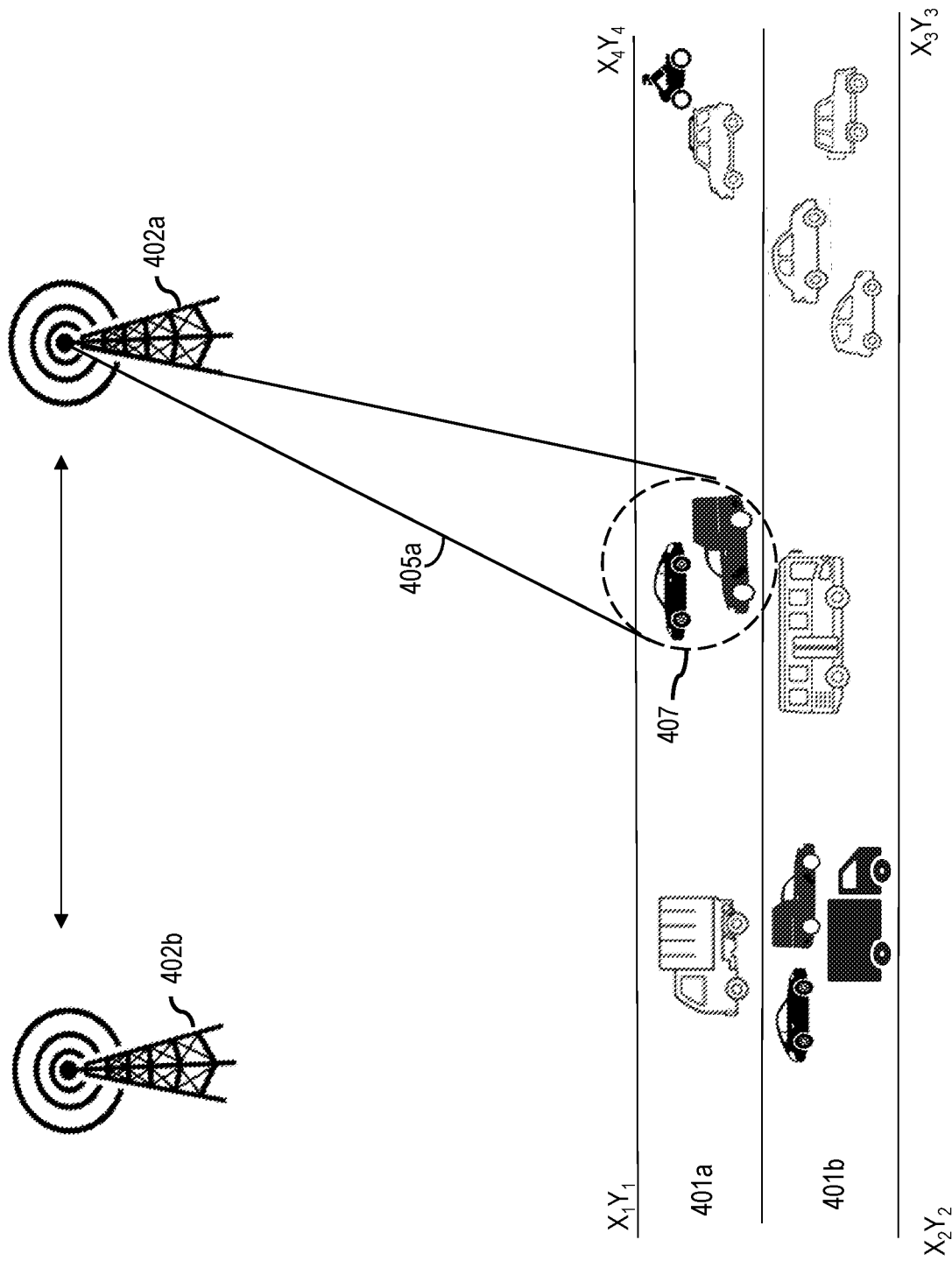
FIG. 4 is a diagram illustrating handover of vehicle cluster information from one antenna array to a neighboring antenna array, according to example embodiment(s)

FIG. 4 is a diagram illustrating the handover of vehicle cluster information from one antenna array to neighboring antenna array. Specifically, the figure shows an antenna array 402a emitting and directing an antenna beam 405a to a vehicle cluster 407 that is traveling on road link 401a. The vehicle cluster 407 is moving toward a neighboring antenna array 402b. As the vehicle cluster 407 comes in proximity with the neighboring antenna array 402b, the antenna array 402a, or hardware associated with the antenna array 402a, shares vehicle cluster information corresponding to the vehicle cluster 407 with the neighboring antenna array 402b. This ensures continuous 5G connectivity for the vehicle cluster 407. In one embodiment, the antenna array 402a shares the vehicle cluster information when the position of vehicle cluster 407 is within a predetermined distance from antenna array 402a or antenna array 402b. In another embodiment, the trajectory module 114 shares the vehicle cluster information with the neighboring antenna array 402b when the position of vehicle cluster 407 is within a predetermined distance from antenna array 402a or antenna array 402b. By sharing vehicle cluster information beforehand, the neighboring antenna array 402b does not need to duplicate processing steps or computation of the vehicle cluster trajectory. This also enables the neighboring antenna array 402b to continue to deliver high-speed internet connectivity to the vehicle cluster 407a without interruption, even when the vehicle cluster 407 is moving from a coverage area of the antenna array 402a to a coverage area of the neighboring antenna array 402b. The coverage area of the antenna array is dependent on the beamforming capability of the antenna array.

Figure 5B:
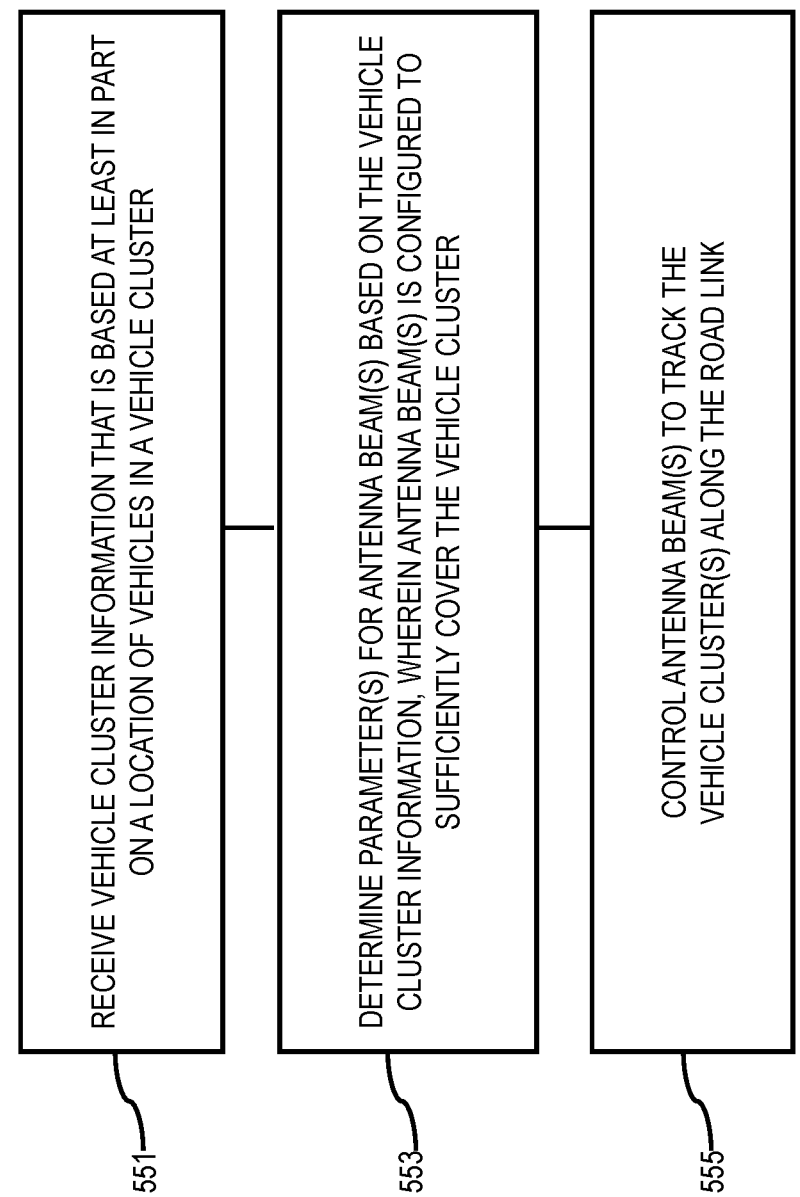
FIG. 5B is another flowchart setting forth steps of a process for emitting an antenna beam to a vehicle cluster along a road link, according to example embodiment(s)
Figure 10:
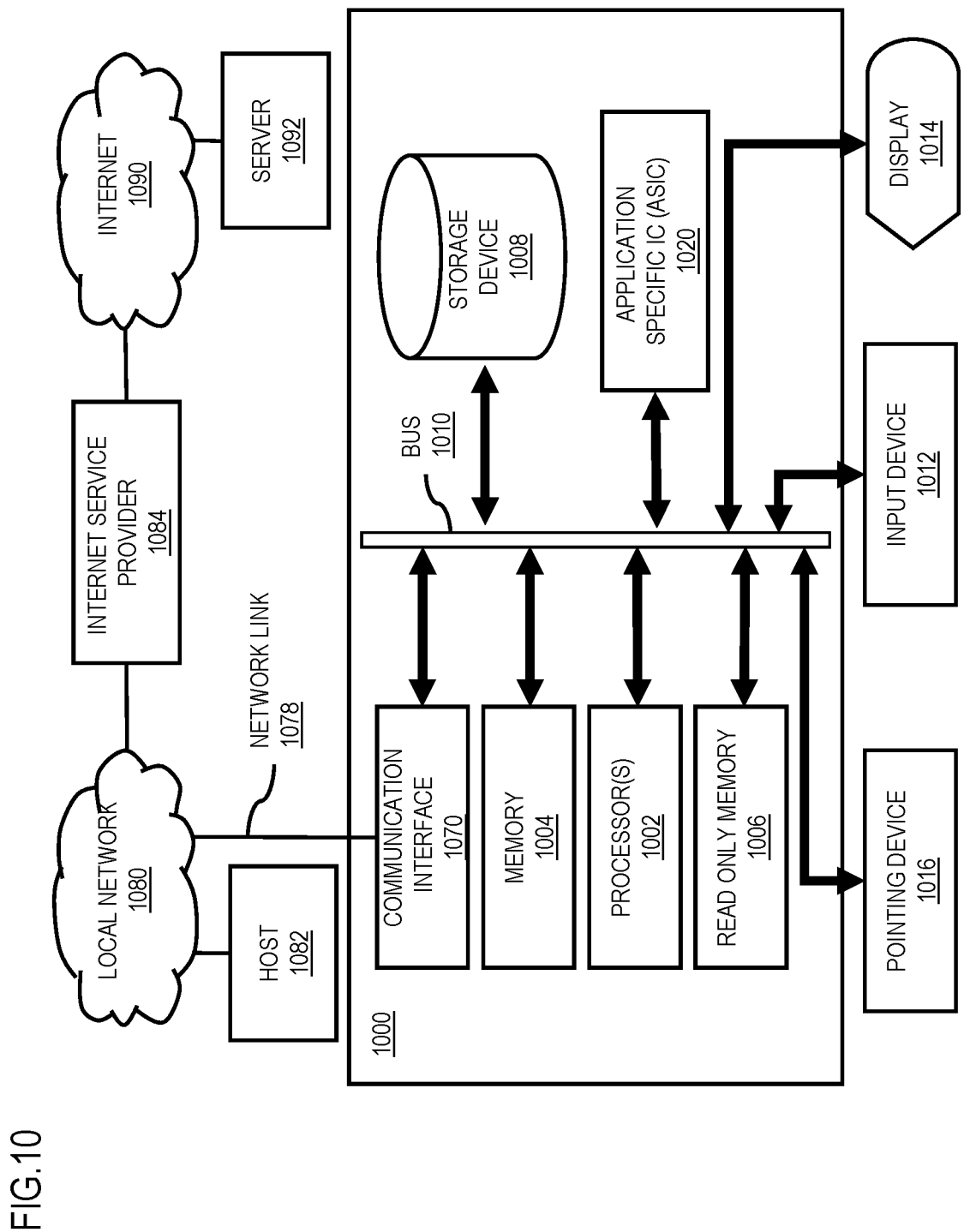
FIG. 10 is a diagram of hardware that can be used to implement example embodiment(s)

FIGS. 5A and 5B show flowcharts setting forth steps of processes 500 and 550, respectively, for emitting and directing one or more antenna beam to one or more vehicle clusters along the road link 101, according to example embodiment(s). In various embodiments, the vehicle platform 110, the base-station platform 120, the clustering modules 112, the trajectory module 114, the parameter identification module 122, the handover module 124, the LOS module 126, and the capability module 128 may perform one or more steps of the processes 500 and 550, and may be implemented in, for instance, a chip set including a processor and a memory as shown in FIG. 10. As such, the vehicle platform 110, the base-station platform 120, the clustering modules 112, the trajectory module 114, the parameter identification module 122, the handover module 124, the LOS module 126, and the beamforming capability module 128 can accomplish functions of various steps of the processes 500 and 550, as well as accomplish various embodiments of other processes described herein in conjunction with other components of the system 100. Although processes 500 and 550 are illustrated as a sequence of steps, its contemplated that various steps of processes 500 and 550 may be performed in any order or combination and need not include all the illustrated steps.

Referring particularly to FIG. 5A, in step 501, one or more vehicle cluster may be generated. As described, vehicle clusters may be generated based on predefined criteria, such as vehicle co-location or proximity, as well as beamforming capability. In some embodiments, the clustering module 112 may be configured to generate the vehicle cluster(s). As indicated by step 551 in FIG. 5B, in some aspects, a variety of vehicle cluster information may be accessed generated, such as information associated with locations and trajectories of vehicles in a vehicle cluster. Furthermore, the vehicle cluster information may include the size and shape of vehicles in the vehicle cluster, the number of vehicles in the cluster, the direction of travel of vehicles or vehicle cluster, average speed of the vehicle cluster, vehicle or cluster trajectories, or combination thereof. The list of information/parameters is provided by way of illustration and not limitation. In some embodiments, the parameter identification module 122 may receive the vehicle cluster information. In addition, the parameter identification module 122 may receive the vehicle information from the trajectory module 114.

A number of parameters for one or more antenna beams may be determined, as indicated by step 503 of FIG. 5A. In some implementations, the parameter identification module 122 can be configured to select or compute the antenna beam parameter(s). By way of example, beam parameters may include signal strength, elevation angle, beam width, and azimuth angle relative to the one or more antenna arrays, as well as other beam parameters.

In some aspects, beam parameters may be selected or computed based on the characteristics and location of a target (e.g. one or more vehicles or a vehicle cluster). For instance, the beam width of a beam emitted by an antenna array is generally broader near the array and becomes narrower with distance. Hence, in some aspects, the beam width may be selected or computed to be sufficiently broad at, or near, the location of the target (e.g. multiple vehicles or a vehicle cluster) in order to sufficiently cover the target. Also, a beam width profile, which may include a variation of beam width with distance, may also be selected or computed to achieve sufficient coverage of the target.

As described herein, sufficient coverage may include a coverage or overlap exceeding 80%, 90%, or more, of the region defined by the target with the antenna beam. Similarly, the signal strength may be selected or computed to achieve adequate connection or data transmission to and from the target. In some aspects, signal strength or power may be specified in Watts, dB, dBi, or other appropriate units. Although the figures depict vehicle clusters using circles (e.g. FIG. 1), it may be readily appreciated that such target regions may include any polygon shapes and may extend in 2D or 3D. Furthermore, the shape of antenna beams shown in the figures is selected for illustrative purposes. Generally, the antenna beams may have any shape, and may include multiple lobes, as recognized by those skilled in the art.

The azimuth angle $\varphi$ is the angle commonly measured relative to true (geographic) north, and an observed object (e.g. vehicle cluster). The azimuth angle $\varphi$ is typically measured clockwise in degrees from the true north. Also, the elevation angle $\theta$ commonly describes the inclination of a beam along the z-axis from the perspective of the antenna array. By selecting or controlling the azimuth angle $\varphi$ and elevation angle $\theta$, antenna beams may be appropriately directed toward a target. It should be apparent, however, that different coordinate systems, such as spherical coordinates, cylindrical coordinates, cartesian coordinates, WGS-84 or the like, could be utilized to characterize the orientation and shape of antenna beams. Similarly, a coordinate system may use a frame of reference corresponding to an antenna array, to the earth, or any other suitable point of reference.

Then, as indicated by step 505 of FIG. 5A, the antenna beam(s) emitted by the antenna array 102 may be directed to the vehicle cluster(s). Once a vehicle cluster receives the antenna beam(s), vehicles in the vehicle cluster can use the high bandwidth capacity and fast speed of the 5G to support a range of use cases, such as autonomous driving, 5G gaming/streaming, virtual reality, artificial intelligence (AI), and IoT applications, and many others. In some aspects, as indicated by steps 553 and 555 in FIG. 5B, antenna beam(s) characterized by determined parameter(s) may be emitted from one or more antenna arrays 102 and controlled to track the vehicle cluster(s) according to the vehicle cluster information. In this manner, various vehicle routes can be continuously supported with 5G, and provide technical capabilities not previously possible or feasible, such as the ability to schedule data transmissions to occur while vehicles are travelling on the road (e.g., for movie streaming, etc.)

Figure 6A:
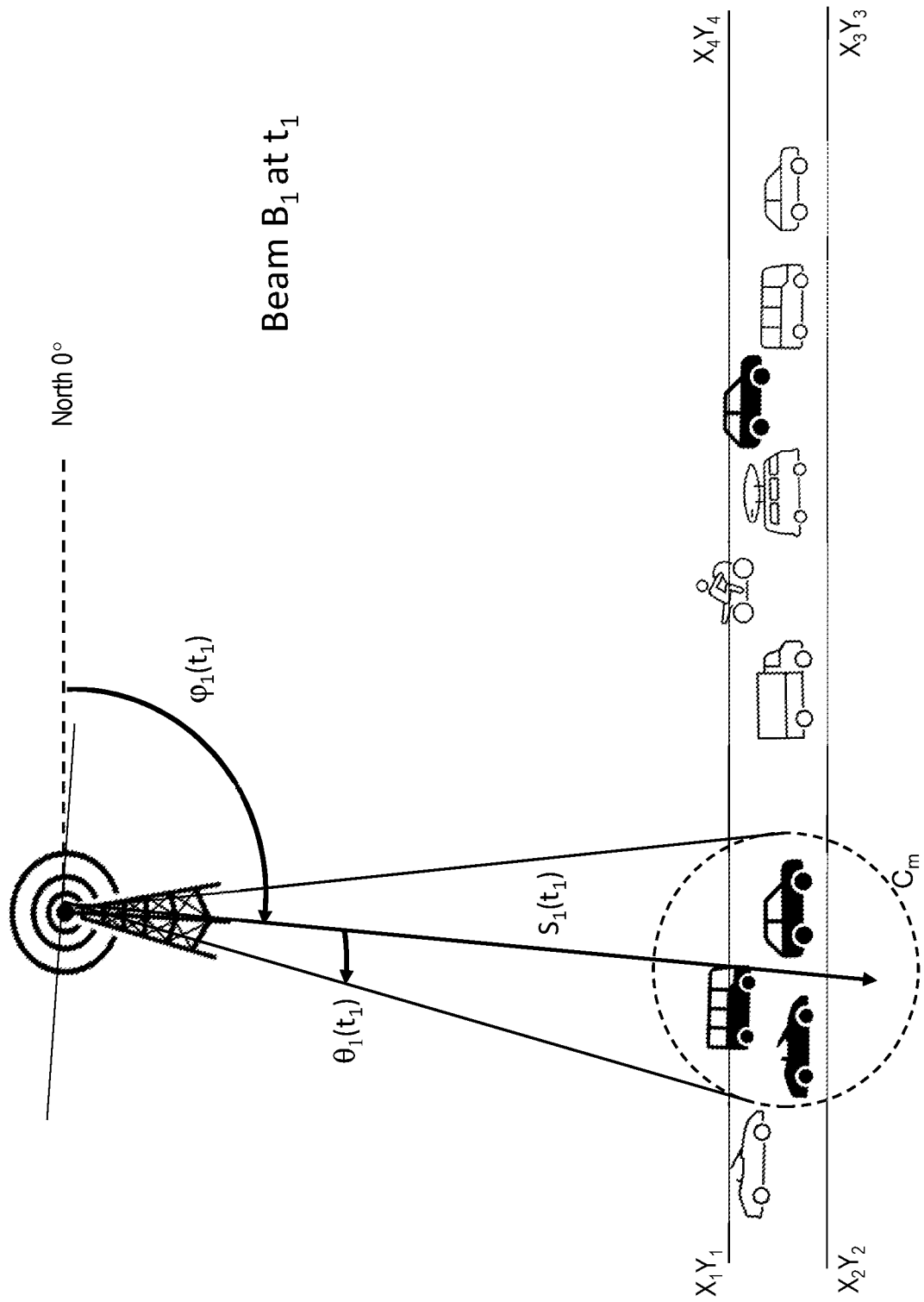
FIGS. 6A, 6B and 6C are diagrams illustrating changes in azimuth angle and elevation angle as a vehicle cluster is moving along the road link, according to example embodiment(s)
Figure 6B:
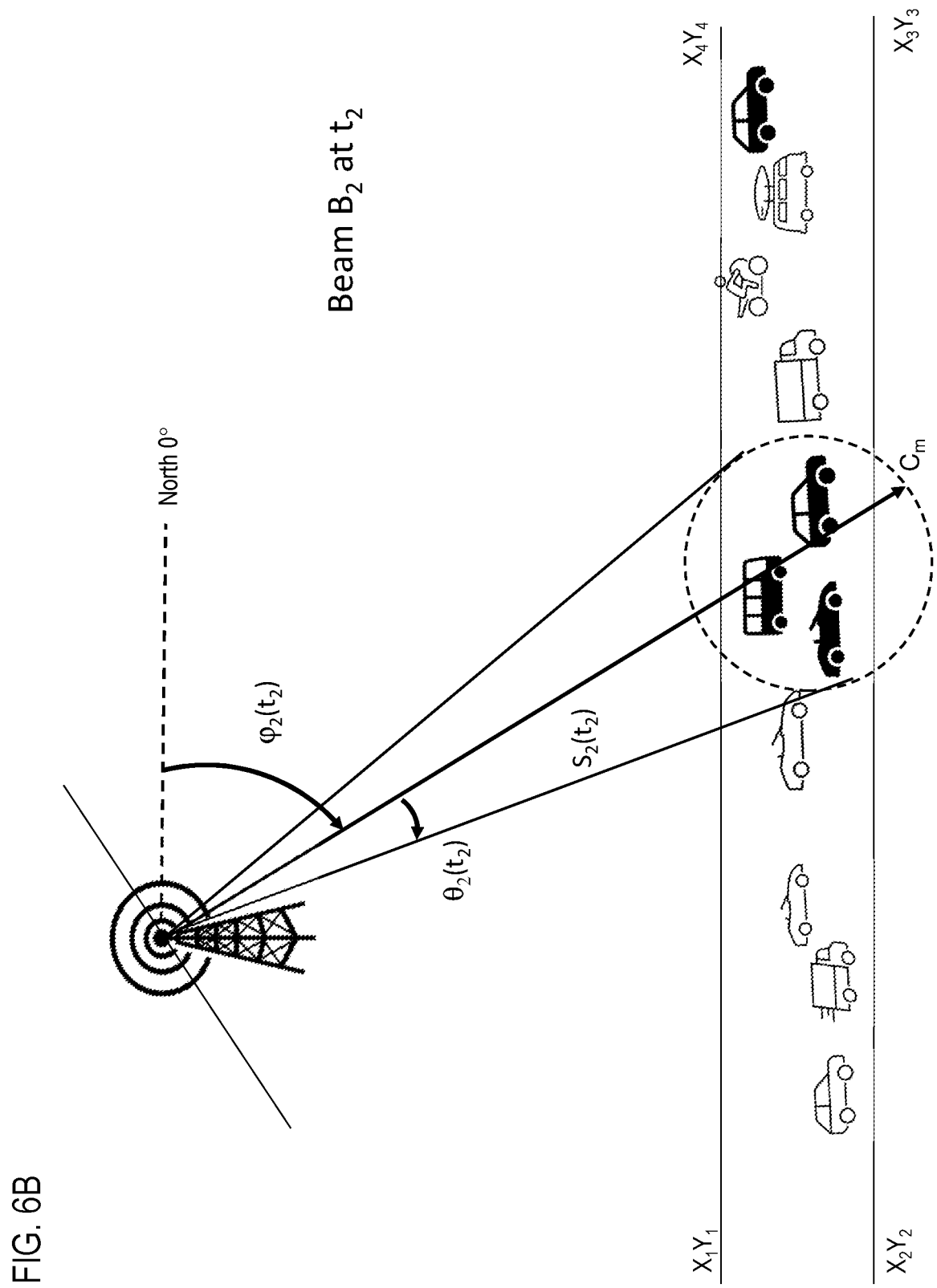
Figure 6C:
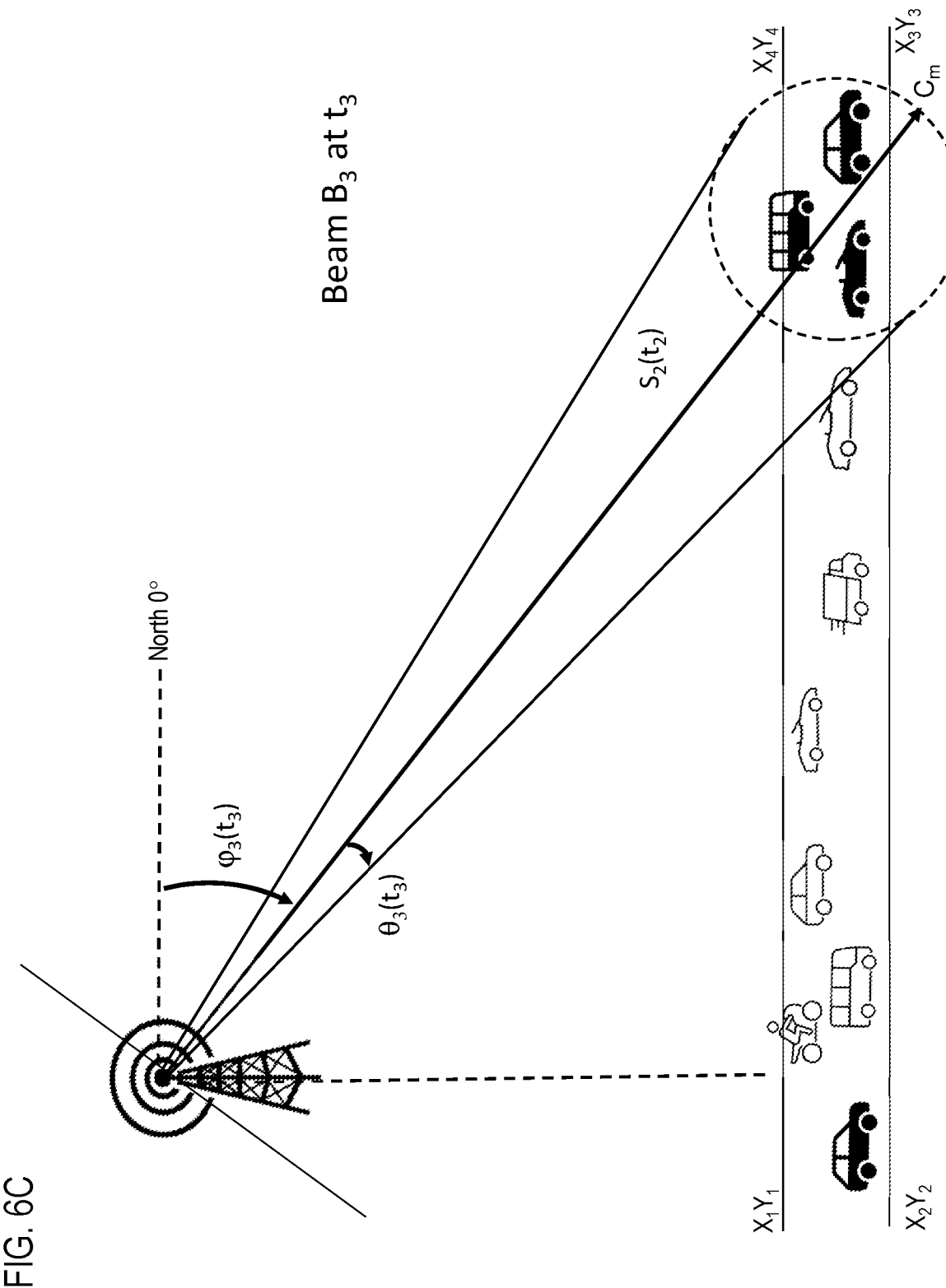

FIGS. 6A, 6B and 6C are diagrams illustrating changes in the azimuth angle ($\varphi_{Bn}$) and elevation angle ($\theta_{Bn}$) of antenna beams emitted over period of time ($t_1$, $t_2$ and $t_3$) to track a vehicle cluster ($C_m$) as the cluster is moving along a road link, according to example embodiment(s). In the figures, the value of signal strength ($S_n$) of antenna beam, the azimuth angle ($\varphi_n$) and angle of elevation ($\theta_n$) vary as the vehicle cluster $C_m$ as it is moving along the road link. As shown, the azimuth angle ($\varphi_n$) may be computed from the true north 0° and the angle of elevation ($\theta_{Bn}$) may be computed from the horizon. As appreciated from the figures, the characteristic and profile of each antenna beam ($B_n$) changes as a function of the vehicle cluster ($C_m$) location, based upon the signal strength ($S_{Bn}$) of antenna beam, the angle of elevation ($\theta_n$) and the angle of azimuth ($\varphi_n$) needed to direct the respective beam to the cluster. To this end, each antenna beam ($B_n$) may be described as follows:

$$B_n(C_m(t_n))=S_n, \varphi_n, \theta_n$$

As the vehicle cluster ($C_m$) moves along the road link, the value of signal strength ($S_{Bn}$) of antenna beam, the angle of elevation ($\theta_{Bn}$) and the angle of azimuth ($\varphi_{Bn}$) is changed to provide continuous beam coverage to the vehicle cluster ($C_m$).

Figure 7:
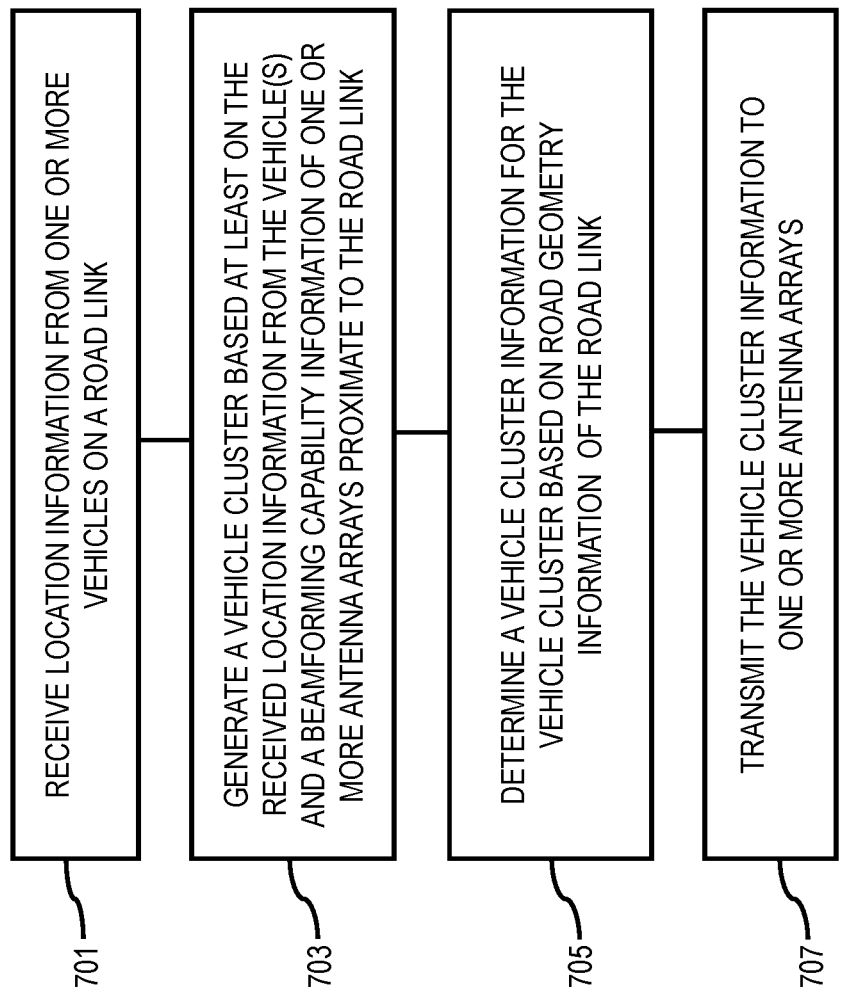
FIG. 7 is a flowchart setting forth steps of a process for determining vehicle cluster information, according to example embodiment(s)

FIG. 7 is a flowchart of a process 700 for determining vehicle cluster information, according to example embodiment(s). In various embodiments, the vehicle platform 110, the base-station platform 120, the clustering modules 112, trajectory module 114, the parameter identification module 122, the handover module 124, the LOS module 126 and the capability module 128 may perform one or more portions of the process 700 and may be implemented in, for instance, a chip set including a processor and a memory as shown in FIG. 10. As such, the vehicle platform 110, the base-station platform 120, the clustering modules 112, the trajectory module 114, the parameter identification module 122, the handover module 124, and the LOS module 126, the capability module 128 can accomplish functions of various parts of the process 700, as well as can accomplish various embodiments of other processes described herein in conjunction with other components of the system 100. Although the process 700 is illustrated and described as a sequence of steps, its contemplated that various embodiments of the process 700 may be performed in any order or combination and need not include all the illustrated steps.

In an embodiment, the base-station platform 120 or the parameter identification module 122, the handover module 124, the LOS module 126, the beamforming capability module 128 may be implemented as a cloud-based service, local service, native application, or combination thereof. Though depicted as a separate entity in FIG. 1, it is contemplated that the base-station platform 120 may be implemented as a module of any other component of the system 100. In an embodiment, the base-station platform 120 or the parameter identification module 122, the handover module 124, the LOS module 126, the beamforming capability module 128 may be implemented as a cloud-based service, local service, native application, or combination thereof.

In step 701, location information may be received from one or more vehicles on a road link. In some implementations, the clustering module 112 receives location information from the vehicle(s). In step 703, a vehicle cluster may be generated. In some aspects, the vehicle cluster may be generated or selected based on predefined criteria, and more particularly, based on the received location information from the one or more vehicles and beamforming capability information of antenna arrays proximate to the road link. In some implementations, the clustering module 112 may be configured to generate the vehicle cluster.

In step 705, vehicle cluster information may be generated. In some aspects, the vehicle cluster information may be generated based on a road geometry information of the road link, as described. In some implementations, the trajectory module 114 determines the vehicle cluster information, including the trajectory, speed, and other information associated with the vehicle cluster. Then, in step 707, the vehicle cluster information may then be transmitted to one or more antennas. In some implementations, the trajectory module 114 may be configured to transmit the vehicle cluster information.

Figure 8:
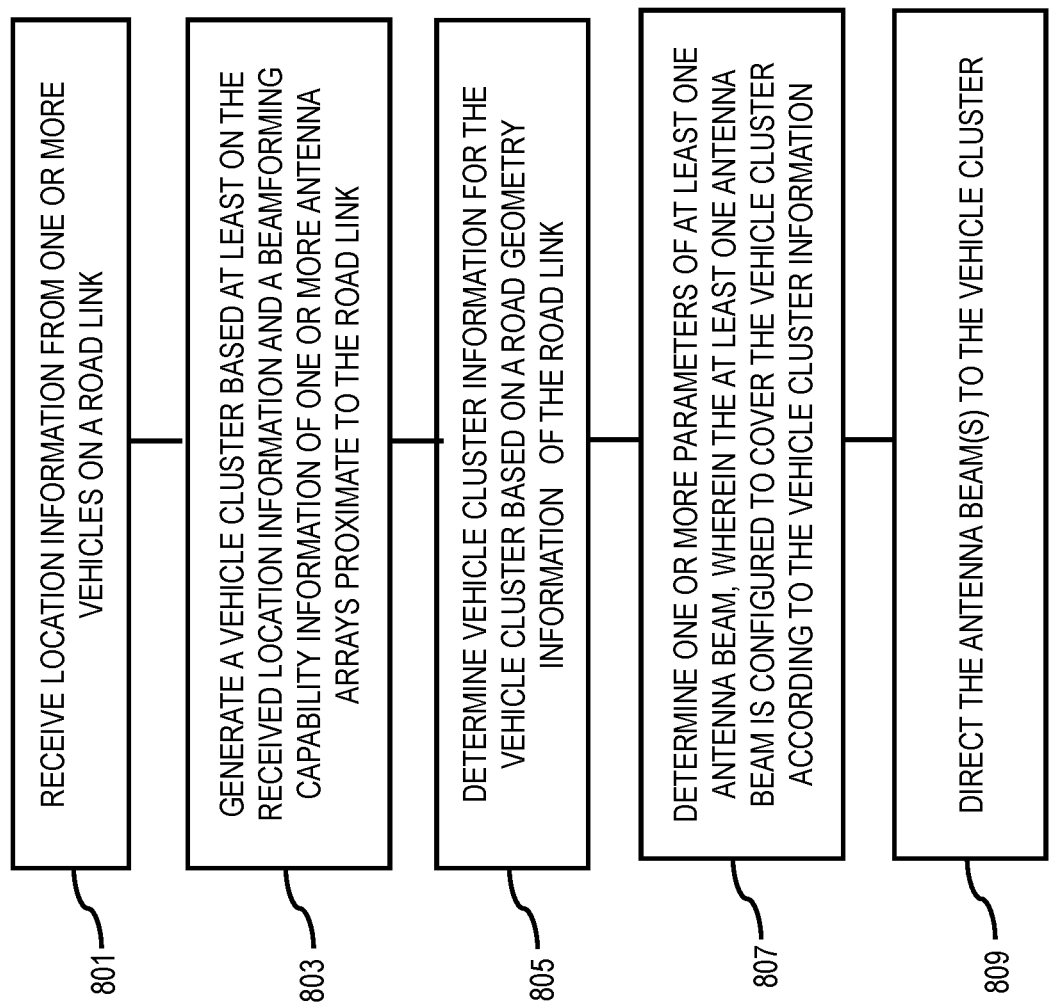
FIG. 8 is a flowchart setting forth steps of a process for emitting an antenna beam to a vehicle cluster along a road link, according to example embodiment(s)

Turning now to FIG. 8, a flowchart setting forth steps of a process 800 for directing one or more antenna beams to vehicle cluster(s) along the road link 101 is shown, according to example embodiment(s). In various embodiments, the vehicle platform 110, the base-station platform 120, the clustering modules 112, the trajectory module 114, the parameter identification module 122, the handover module 124, the LOS module 126 and the capability module 128 may perform one or more portions of the process 800 and may be implemented in, for instance, a chip set including a processor and a memory as shown in FIG. 10. As such, the vehicle platform 110, the base-station platform 120, the clustering modules 112, the trajectory module 114, the parameter identification module 122, the handover module 124, and the LOS module 126, the capability module 128 can accomplish functions of various parts of the process 800, as well as can accomplish various embodiments of other processes described herein in conjunction with other components of the system 100. Although the process 800 is illustrated and described as a sequence of steps, its contemplated that various embodiments of the process 800 may be performed in any order or combination and need not include all the illustrated steps.

In step 801, location information from or corresponding to one or more vehicles on a road link may be received or accessed. In some implementations, the clustering module 112 receives location information. In step 803, a vehicle cluster may then be generated. In some implementations, the clustering module 112 generates a vehicle cluster based at least on the received location information from the one or more vehicles and a beamforming capability information of one or more antenna arrays proximate to the road link. In one embodiment, the beamforming capability information and location of the antenna array(s) may be stored in, and accessed from, the geographic database.

In an embodiment, the clustering module 112 may use machine learning models to select vehicles for generating a vehicle cluster. To this end, the clustering module 112 may receive or access a number of factors or inputs, such as vehicle models, traffic patterns, road topology, driving behaviors, vehicle sensors, map data, vehicle mobility, surrounding obstructions/objects (i.e., fixed or moving), beamforming capability information etc. In one embodiment, a machine learning model utilized by the clustering module 112 may select or assign respective weights, correlations, relationships, etc. among the factors, to determine vehicles corresponding to a vehicle cluster. In one instance, the machine learning model can be continuously updated during training using, for instance, supervised deep convolution networks or equivalents. In an embodiment, the machine learning model includes a support vector machine (SVM), neural network, decision tree, etc. In other words, the machine learning model may use the respective weights of the factors to efficiently determine the vehicles for the vehicle cluster under different scenarios in different regions.

In step 805, vehicle cluster information may be determined for the vehicle cluster. In some aspects, the vehicle cluster information may be based on road geometry information of the road link, and may include vehicle cluster trajectory, along with other information. In some implementations, the trajectory module 114 determines vehicle cluster information for the vehicle cluster. The road geometry information of the road link may be stored in, and accessed from, the geographic database 121, or elsewhere.

In step 807, one or more parameters of at least one antenna beam may be determined. As shown n FIG. 8, in some aspects, the antenna beam(s), by virtue of the one or more parameters, may be configured such that that the beam(s) cover the vehicle cluster according to the vehicle cluster information. In some implementations, the parameter identification module 122 determines one or more parameters of the antenna beam(s). In one embodiment, the parameter identification module 122 may utilize machine learning models to determine the beam parameter(s). As described, the parameter identification module 122 may consider a number of factors, such as vehicle cluster parameters, traffic patterns, road topology, driving behaviors, vehicle mobility, surrounding obstructions/objects (i.e., fixed or moving), beamforming capability information etc. In one embodiment, a machine learning model may be configured to select or assign respective weights, correlations, relationships, etc. among the factors, to determine the parameters. In one instance, a machine learning model can be continuously updated during training using, for instance, supervised deep convolution networks or equivalents. In an embodiment, the machine learning model includes a support vector machine (SVM), neural network, decision tree, etc. In other words, the machine learning model may use the respective weights of the factors to efficiently determine beam parameters under different scenarios in different regions.

In step 809, one or more antenna beams may be directed to the vehicle cluster. To this end, one or more antenna arrays may be configured to emit and control the antenna beam(s). Once the vehicle cluster receives the 5G antenna beam, each vehicle of the vehicle cluster can use high bandwidth capacity and fast speed of the 5G internet connectivity to support a range of use cases, such as autonomous driving, 5G gaming/streaming, virtual reality, artificial intelligence (AI), and IoT applications, etc. In some embodiment, the antenna array(s) may emitting OFDM (Orthogonal Frequency Division Multiplex) modulated signals in the mm Wave spectrum (OSI Layer 1). The modulated signals may be used to encode data packages using Polar Codes (OSI Layer 2). The data packages, in a higher OSI layer, may contain navigation, multimedia, or other data for consumption by vehicles in the vehicle cluster. The antenna beam(s) may be configured as concentrated signals built using constructive and destructive interference of the OFDM modulated signals in a controlled manner.

As described, the vehicle cluster may travel along the road link. To this end, the antenna beam(s) may be configured to track the vehicle cluster, to provide uninterrupted signals. To this end, a variety of vehicle cluster information may be utilized, including vehicle cluster trajectories. This allows for uninterrupted 5G connectivity, with a variety of use cases, such as the ability to schedule data transmissions to occur when vehicles are travelling on such road links (e.g., for movie streaming), etc.

Returning back to FIG. 1, in one embodiment, the vehicles 103 are configured with various sensors (e.g., vehicle sensors) for generating or collecting sensor data, probe data, related geographic/map data, etc. In one embodiment, the sensed data represents sensor data associated with a geographic location or coordinates at which the sensor data was collected (e.g., a latitude and longitude pair). In one embodiment, the sensor data includes location data collected by one or more vehicle sensors. By way of example, the vehicle sensors may include a RADAR system, a LiDAR system, global positioning sensor(s) for gathering location data (e.g., GNSS such as GPS, GALILEO, GLONASS, etc.), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles, switch sensors for determining whether one or more vehicle switches are engaged, and the like. It is contemplated that the vehicles can be any type of vehicle manned or unmanned (e.g., cars, trucks, buses, vans, motorcycles, scooters, drones, etc.) that travels by road link of a road network.

Other examples of sensors of a vehicle 103 may include light sensors, orientation sensors augmented with height sensors and acceleration sensor (e.g., an accelerometer can measure acceleration and can be used to determine the orientation of the vehicle), tilt sensors to detect the degree of incline or decline of a vehicle 103 along a path of travel, moisture sensors, pressure sensors, etc. In a further example embodiment, vehicle sensors about the perimeter of a vehicle 103 may detect the relative distance of the vehicle 103 from a physical divider, a lane line of a link or roadway, the presence of other vehicles, pedestrians, traffic lights, potholes and any other objects, or a combination thereof. In one scenario, the vehicle sensors may detect weather data, traffic information, or a combination thereof. In one embodiment, a vehicle 103 may include GNSS, or other satellite-based receivers configured to obtain geographic coordinates from satellites 130 for determining the current location and time. Further, the location can be determined by visual odometry, triangulation systems such as A-GPS, Cell of Origin, or other location extrapolation technologies.

In one embodiment, the UEs 111 may also be configured with various sensors (not shown for illustrative convenience) for acquiring or generating sensor data or probe data associated with a vehicle 103, a driver, a passenger, other vehicles, conditions regarding the driving environment or roadway, etc. For example, such sensors may be used as GNSS receivers for interacting with the one or more satellites 130 to determine and track the current speed, position, and location of a vehicle 103 travelling along a link or road segment. In addition, the sensors may gather tilt data (e.g., a degree of incline or decline of the vehicle during travel), motion data, light data, sound data, image data, weather data, temporal data and other data associated with the vehicles 103 or UEs 111. Further still, the sensors may detect local or transient network or wireless signals, such as those transmitted by nearby devices during navigation of a vehicle along a roadway (Li-Fi, near field communication (NFC)) etc.

In one embodiment, the communication network 109 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, 5G/5G New Radio networks (5G NR), Narrowband Internet-of-Things networks (NB-IoT), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 103, vehicle platform 110, base-station platform 120, UEs 111, geographic database 121, or satellites 130 communicate with each other and other components of the system 100 using well known, new or still developing protocols. In this context, a protocol includes a set of rules defining how the network nodes within the communication network 109 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically affected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicates the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 9:
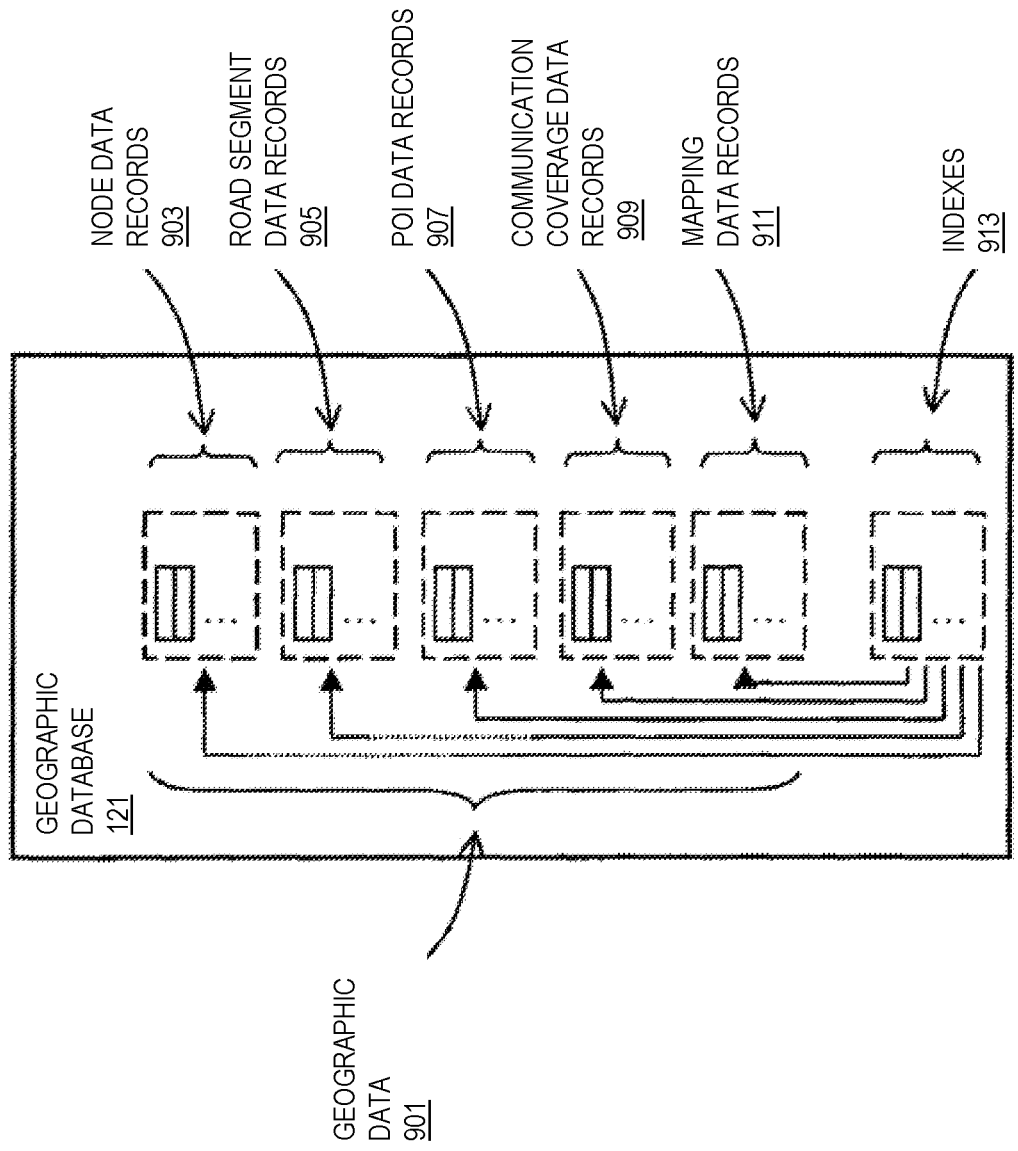
FIG. 9 is a diagram of a geographic database, according to example embodiment(s)

FIG. 9 is a diagram of a geographic database (such as the database 121), according to example embodiment(s). In one embodiment, the geographic database 121 includes geographic data 901 used for (or configured to be compiled and to be used for) mapping or navigation-related services, such as for video odometry based on the parametric representation of lanes include, e.g., encoding or decoding parametric representations into lane lines. In one embodiment, the geographic database 121 includes high resolution or high definition (HD) mapping data that provide centimeter-level or better accuracy of map features. For example, the geographic database 121 can be based on Light Detection and Ranging (LiDAR) or equivalent technology to collect billions of 3D points and model road surfaces and other map features down to the number lanes and their widths. In one embodiment, the mapping data (e.g., mapping data records 911) capture and store details such as the slope and curvature of the road, lane markings, roadside objects such as signposts, including what the signage denotes. By way of example, the mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link"(or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 903, road segment or link data records 905, points of interest ("POI") data records 907, communication coverage data records 909, mapping data records 911, and indexes 913, for example. More, fewer, or different data records can be provided. In one embodiment, additional data records (not shown) can include cartographic ("carto") data records, routing data, and maneuver data. In one embodiment, the indexes 913 may improve the speed of data retrieval operations in the geographic database 121. In one embodiment, the indexes 913 may be used to quickly locate data without having to search every row in the geographic database 121 every time it is accessed. For example, in one embodiment, the indexes 913 can be a spatial index of the polygon points associated with stored feature polygons.

In exemplary embodiments, the road segment data records 905 are links or segments representing roads, streets, or paths, as can be used in the calculated route or recorded route information for determination of one or more personalized routes. The node data records 903 are end points (such as intersections) corresponding to the respective links or segments of the road segment data records 905. The road link data records 905 and the node data records 903 represent a road network, such as used by vehicles, cars, or other entities. Alternatively, the geographic database 121 can contain path segment and node data records or other data that represent pedestrian paths or areas in addition to or instead of the vehicle road record data, for example.

The road links and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 907. The geographic database 121 can also include data about places, such as cities, towns, or other communities, and other geographic features, such as bodies of water, mountain ranges, etc. Such place or feature data can be part of the POI data records 907 or can be associated with POIs or POI data records 907 (such as a data point used for displaying or representing a position of a city).

In one embodiment, the geographic database 121 can also include communication coverage data records 909 for storing vehicle sensor data, single-path communication signal characteristics data, road-link map attribute data, filtered road-link map attribute data, single-path communication coverage information, quality of service measurement data, training data, prediction models, annotated observations, computed featured distributions, sampling probabilities, or any other data generated or used by the system 100 according to the various embodiments described herein. By way of example, the communication coverage data records 909 can be associated with one or more of the node records 903, road segment records 905, or POI data records 907 to support localization or visual odometry based on the features stored therein and the corresponding estimated quality of the features. In this way, the communication coverage data records 909 can also be associated with or used to classify the characteristics or metadata of the corresponding records 903, 905, or 907.

In one embodiment, as discussed above, the mapping data records 911 model road surfaces and other map features to centimeter-level or better accuracy. The mapping data records 911 also include lane models that provide the precise lane geometry with lane boundaries, as well as rich attributes of the lane models. These rich attributes include, but are not limited to, lane traversal information, lane types, lane marking types, lane level speed limit information, or the like. In one embodiment, the mapping data records 911 are divided into spatial partitions of varying sizes to provide mapping data to vehicles 103 and other end user devices with near real-time speed, without overloading the available resources of the vehicles 103 or devices (e.g., computational, memory, bandwidth, etc. resources).

In one embodiment, the mapping data records 911 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the mapping data records 911.

In one embodiment, the mapping data records 911 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, or the like. In one embodiment, certain attributes, such as lane marking data records, mapping data records or other attributes can be features or layers associated with the link-node structure of the database.

In one embodiment, the geographic database 121 can be maintained by the content providers in association with the services platform (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicles 103 along roads throughout the geographic region to observe features or record information about them, for example. Also, remote sensing, such as aerial or satellite photography, can be used.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production or delivery formats can be compiled or further compiled to form geographic database products or databases, which can be used in end user navigation devices or systems.

For example, geographic data is compiled (such as into a platform specification format (PSF) format) to organize or configure the data for performing navigation-related functions or services, such as route calculation, route guidance, map display, speed calculation, distance and travel time functions, and other functions, by a navigation device, such as by a vehicle 103 or a user terminal 111, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for building single-path communication signal map data for road links may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 10 illustrates a computer system 1000 upon which an embodiment of the disclosure may be implemented. Computer system 1000 is programmed (e.g., via computer program code or instructions) to carry out steps, as described herein, and may include a variety of hardware and software.

Referring specifically to the figure, the computer system 1000 includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

The bus 1010 includes one or more parallel conductors of information so that information is transferred quickly among devices coupled to the bus 1010. One or more processors 1002 for processing information are coupled with the bus 1010, as shown. A processor 1002 performs a set of operations on information as specified by computer program code related to methods described herein. The computer program code is a set of instructions or statements providing instructions for the operation of the processor or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for building single-path communication signal map data for road links. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for carrying out methods or steps as described herein, is provided to the bus 1010 for use by the processor from an external input device 1012, such as a keyboard containing alphanumeric keys operated by a human user, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operates with their own processors, such as printers, scanners and external disks. In general, the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 109 for building single-path communication signal map data for road links.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system can be deployed in various configurations within other computer systems, e.g., host 1082 and server 1092. In an embodiment, the vehicle platform (110) and the base station platform (120) is implemented as the server host 1092.

Figure 11:
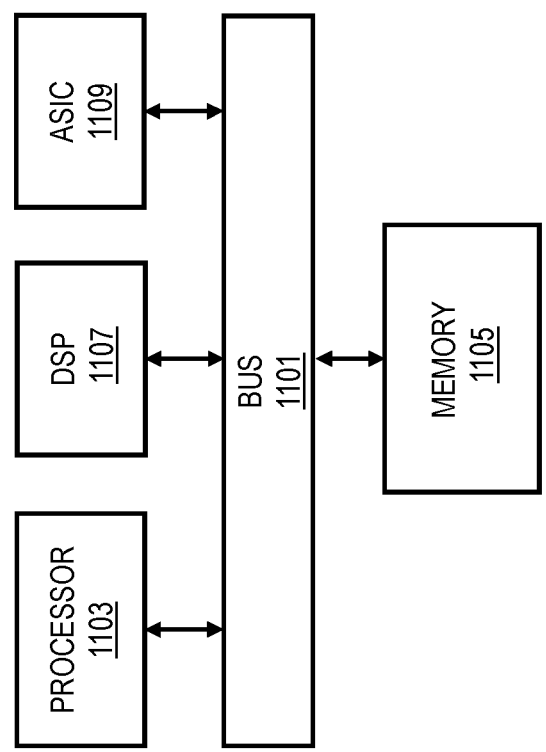
FIG. 11 is a diagram of a chip set that can be used to implement example embodiment(s)

FIG. 11 illustrates a chip set 1100 upon which an embodiment of the disclosure may be implemented. Chip set 1100 is programmed to carry out methods or steps, as described herein, and includes, for instance, the processor and memory components described with respect to FIG. 11 incorporated in one or more physical packages (e.g., chips). By way of example, a physical package includes an arrangement of one or more materials, components, or wires on a structural assembly (e.g., a baseboard) to provide one or more characteristics such as physical strength, conservation of size, or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein build single-path communication signal map data for road links. The memory 1105 also stores the data associated with or generated by the execution of the inventive steps.

Figure 12:
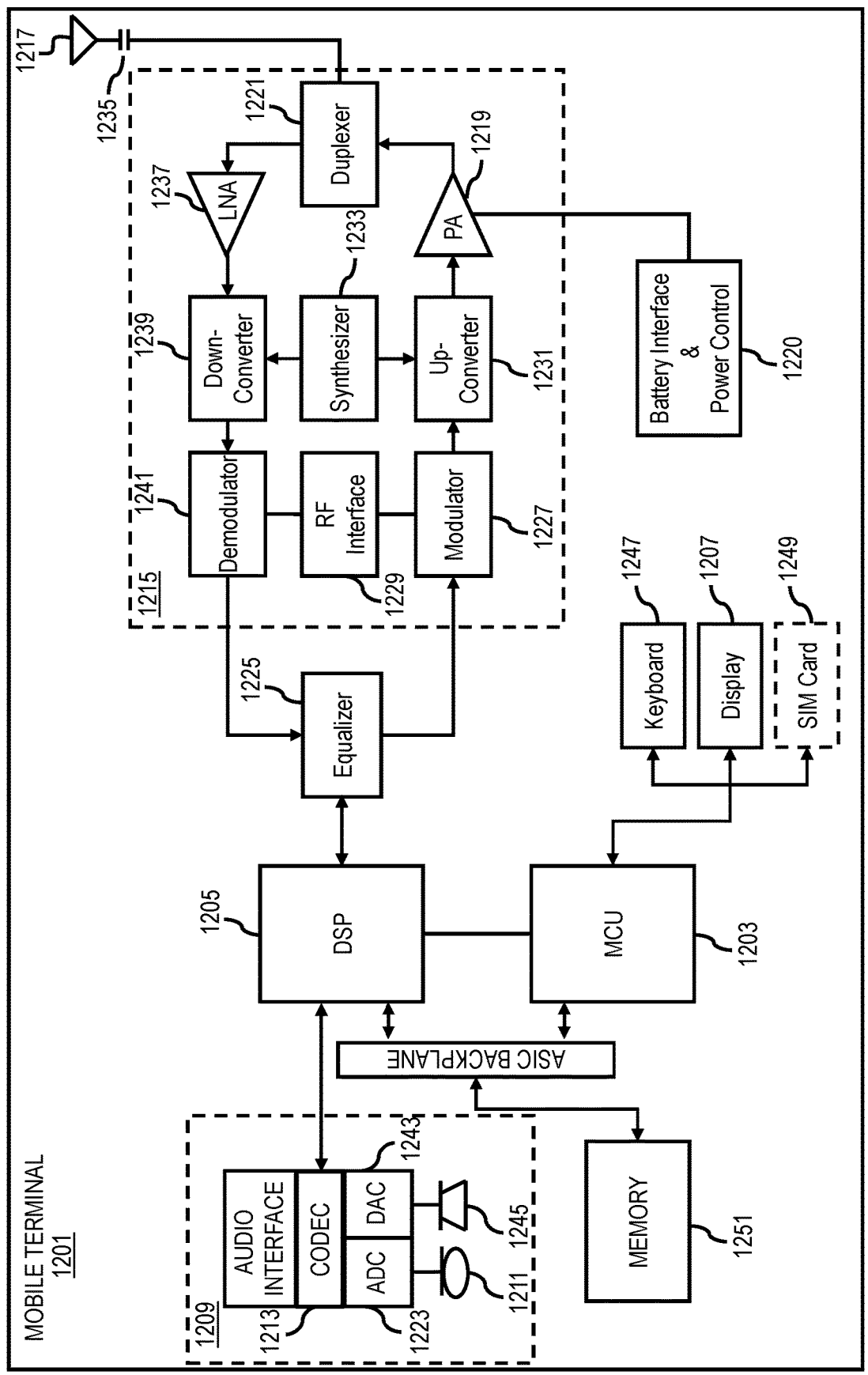
FIG. 12 is a diagram of a mobile terminal that can be used to implement example embodiment(s).

FIG. 12 is a diagram of exemplary components of a mobile terminal 1201 (e.g., handset or vehicle or part thereof) configured to carry out methods or steps, as described herein, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, 5G, code division multiple access (CDMA), wireless fidelity (WiFi), satellite, and future developed wireless technologies.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 build single-path communication signal map data for road links. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201. The MCU 1203 may also carry out methods or steps in accordance with aspects of the present disclosure.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network. The card 1249 also contains a memory for storing a personal telephone number registry, text messages, and user specific mobile station settings.

While the disclosure has been described in connection with a number of embodiments and implementations, the disclosure is not so limited but covers various obvious modifications and equivalent arrangements, which fall within the purview of the appended claims. Although features of the disclosure are expressed in certain combinations among the claims, it is contemplated that these features can be arranged in any combination and order.

The invention claimed is:

1. A method for providing a wireless data connection to a vehicle, the method comprising:
   receiving vehicle cluster information that is based at least in part on location information of each vehicle in a vehicle cluster traveling on a road link;
   determining one or more parameters for at least one antenna beam based on the vehicle cluster information, wherein the at least one antenna beam is configured to sufficiently cover the vehicle cluster; and
   controlling the at least one antenna beam to track the vehicle cluster along the road link,
   wherein a maximum width and a maximum length of the at least one antenna beam is determined based on a distance between one or more antenna arrays and a location of the vehicle cluster on the road link.

2. The method of claim 1, wherein the one or more parameters of the at least one antenna beam comprises a signal strength, a beam width, an elevation angle, and an azimuth angle relative to the one or more antenna arrays.

3. The method of claim 1 further comprising determining the vehicle cluster information based on a direction of travel and a speed of at least one of the vehicles in the vehicle cluster on the road link.

4. The method of claim 1 further comprising transmitting the vehicle cluster trajectory information from the one or more antenna arrays to at least one neighboring antenna arrays based on a proximity between the vehicle cluster and the at least one neighboring antenna arrays.

5. The method of claim 1 further comprising directing the at least one antenna beam from the one or more antenna arrays when the vehicle cluster is in a direct line of sight of the one or more antenna arrays.

6. The method of claim 1 further comprising providing a multipath tolerant connection from the one or more antenna arrays when the vehicle cluster is not in a direct line of sight of the one or more antenna arrays.

7. An apparatus for providing a wireless data connection to a vehicle, the apparatus comprising:
at least one processor; and
at least one memory including computer program code for one or more programs, the at least one memory and the computer program code configured to, with the at least one processor, cause the apparatus to perform at least the following:
receive location information from one or more vehicles on a road link;
generate a vehicle cluster based at least on the received location information and a beamforming capability information of one or more antenna arrays proximate to the road link;
determine vehicle cluster information for the vehicle cluster based on road geometry information of the road link; and
transmit the vehicle cluster information to the one or more antenna arrays,
wherein a maximum width and a maximum length of at least one antenna beam is determined based on a distance between the one or more antenna arrays and a location of the vehicle cluster on the road link.

8. The apparatus of claim 7, wherein the beamforming capability information of the one or more antenna arrays comprises the maximum width and the maximum length of the at least one antenna beam emitted by the one or more antenna arrays proximate to the road link.

9. The apparatus of claim 7, wherein the beamforming capability information of the one or more antenna arrays is precomputed.

10. The apparatus of claim 7, wherein the vehicle cluster is generated by selecting at least one vehicle from the one or more vehicles based on a distance between the one or more vehicles, a direction of travel, a speed of the one or more vehicles, or a combination thereof.

11. The apparatus of claim 7, wherein a new vehicle cluster is generated when one or more vehicles in the vehicle cluster changes speed, heading direction, or lane.

12. A non-transitory computer-readable storage medium carrying one or more sequences of one or more instructions which, when executed by one or more processors, cause an apparatus to:
receive location information from one or more vehicles;
generate a vehicle cluster based at least on the received location information and a beamforming capability information of one or more antenna arrays proximate to a road link;
determine vehicle cluster information for the vehicle cluster based on road geometry information of the road link;
determine one or more parameters for at least one antenna beam based on the vehicle cluster information, wherein the at least one antenna beam is configured to sufficiently cover the vehicle cluster; and
control the at least one antenna beam to track the vehicle cluster along the road link,
wherein a maximum width and a maximum length of the at least one antenna beam is determined based on a distance between the one or more antenna arrays and a location of the vehicle cluster on the road link.

13. The computer-readable storage medium of claim 12, wherein the one or more parameters of at least one antenna beam comprises a signal strength, a beam width, an elevation angle, and an azimuth angle relative to the one or more antenna arrays.

14. The computer-readable storage medium of claim 12, wherein the vehicle cluster is generated by selecting at least one vehicle from the one or more vehicles based on a distance between the one or more vehicles, a direction of travel and a speed of the one or more vehicles.

15. The computer-readable storage medium of claim 12, wherein the vehicle cluster information is transmitted from the one or more antenna arrays to at least one neighboring antenna arrays based on a proximity between the vehicle cluster and the at least one neighboring antenna arrays.

16. The computer-readable storage medium of claim 12, wherein the at least one antenna beam is directed from the one or more antenna arrays to the vehicle cluster when the vehicle cluster is in direct line of sight of the one or more antenna arrays.

17. The computer-readable storage medium of claim 12, wherein a multipath tolerant connection is directed from the one or more antenna arrays to the vehicle cluster when the vehicle cluster is not in direct line of sight of the one or more antenna arrays.

18. The computer-readable storage medium of claim 12, wherein a new vehicle cluster is generated when one or more vehicles in the vehicle cluster changes speed, heading direction, lane, or a combination thereof.

* * * * *